(12) United States Patent
Ahadi

(10) Patent No.: US 10,614,058 B2
(45) Date of Patent: Apr. 7, 2020

(54) METHODS AND SYSTEMS FOR ELECTRONIC CONTENT DELIVERY

(71) Applicant: Eaddress LLC, Chicago, IL (US)

(72) Inventor: Shafiq S. Ahadi, St. Louis, MO (US)

(73) Assignee: EADDRESS LLC, Chicago, IL (US)

(*) Notice: Subject to any disclaimer, the term of this patent is extended or adjusted under 35 U.S.C. 154(b) by 0 days.

(21) Appl. No.: 15/628,337

(22) Filed: Jun. 20, 2017

(65) Prior Publication Data

US 2018/0365282 A1 Dec. 20, 2018

(51) Int. Cl.
| | |
|---|---|
| G06F 16/00 | (2019.01) |
| G06F 16/23 | (2019.01) |
| G06Q 30/04 | (2012.01) |
| G06Q 30/02 | (2012.01) |
| G06F 16/29 | (2019.01) |
| G06F 16/951 | (2019.01) |

(52) U.S. Cl.
CPC .......... *G06F 16/2365* (2019.01); *G06F 16/23* (2019.01); *G06F 16/2379* (2019.01); *G06F 16/29* (2019.01); *G06F 16/951* (2019.01); *G06Q 30/0277* (2013.01); *G06Q 30/04* (2013.01)

(58) Field of Classification Search
CPC ......... G06F 17/30047; G06F 17/30876; G06F 17/3089; G06F 17/30887; G06F 17/30893; G06F 16/25; G06F 16/583; G06F 16/951; G06F 16/24575; G06F 16/252; G06F 16/2365; G06F 16/23
See application file for complete search history.

(56) References Cited

U.S. PATENT DOCUMENTS

| | | | |
|---|---|---|---|
| 7,478,140 B2 | 1/2009 | King et al. | |
| 2002/0059381 A1 | 5/2002 | Cook et al. | |
| 2004/0044734 A1* | 3/2004 | Beck | H04L 51/28 709/206 |
| 2007/0043846 A1* | 2/2007 | Grayson | G06Q 10/06 709/223 |
| 2010/0082981 A1 | 4/2010 | Church et al. | |
| 2011/0289158 A1 | 11/2011 | Terranova | |
| 2016/0125031 A1* | 5/2016 | Basalamah | G06Q 10/08 707/609 |
| 2017/0004506 A1* | 1/2017 | Steinman | G06Q 20/4014 |

(Continued)

OTHER PUBLICATIONS

Ilieva, Janet, Steve Baron, and Nigel M. Healey. "Online surveys in marketing research." International Journal of Market Research 44.3 (2002): 1-14.*

(Continued)

*Primary Examiner* — Nan Hutton
(74) *Attorney, Agent, or Firm* — Thompson Coburn LLP

(57) ABSTRACT

An electronic content delivery system is disclosed where electronic content is delivered to accounts based on a destination physical address or a destination electronic address, wherein the electronic addresses correspond to the physical addresses. Thus, as people change physical addresses, the electronic address will remain with the physical address rather than stay with the user at the new physical address. Instead, if a user moves to a new physical address, the user will become associated with a new electronic address (where the new electronic address for the user will be the electronic address corresponding to the user's new physical address).

55 Claims, 25 Drawing Sheets

(56) References Cited

U.S. PATENT DOCUMENTS

2017/0195381 A1\* 7/2017 Michael .............. H04L 65/4015

OTHER PUBLICATIONS

Fisher, Robbert A., and Bill Tuck. "Issues in electronic document delivery." Interlending & document supply 25.1 (1997): 18-24.\*
International Search Report and Written Opinion for PCT/US2018/38292 dated Aug. 31, 2018.

\* cited by examiner

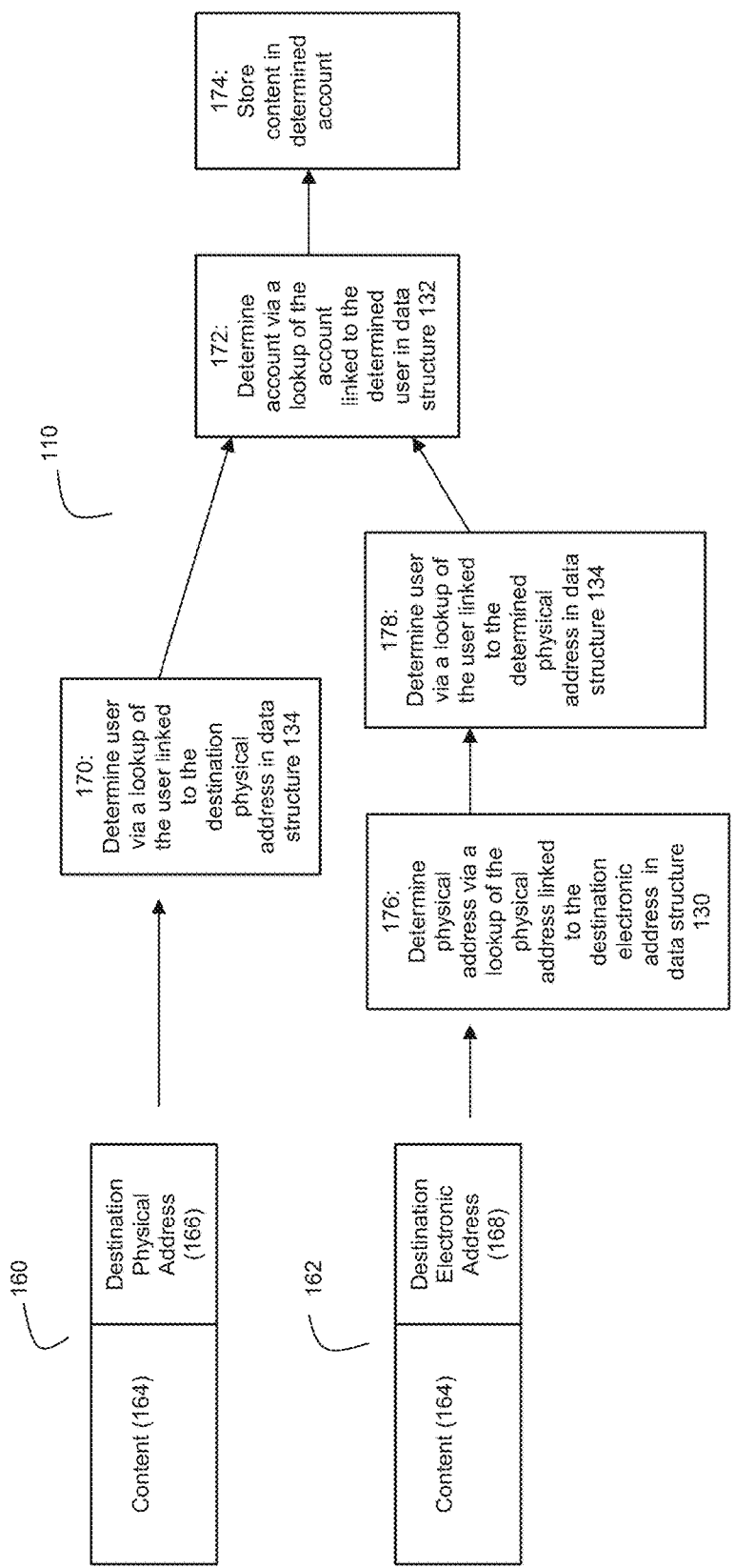
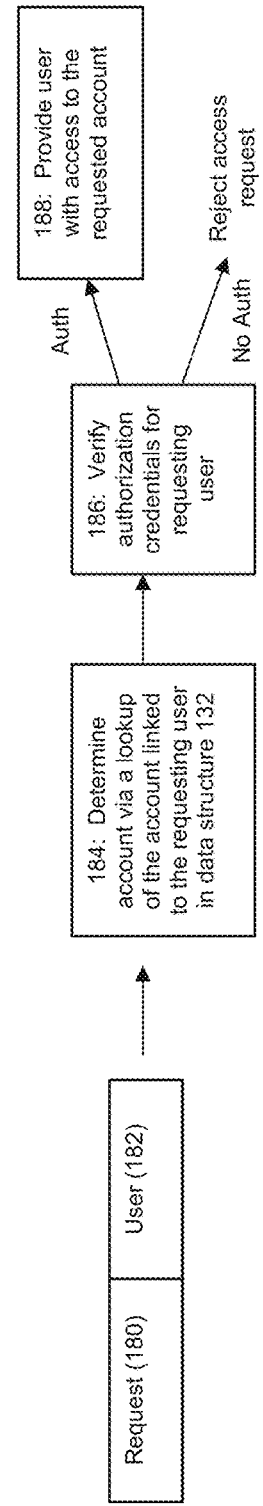
Figure 1D
Figure 1E

| Electronic Address (138) | Physical Address (136) | User ID (140) | Account ID (142) |
|---|---|---|---|
| ... | ... | ... | ... |
| ... | ... | ... | ... |
| ⋮ | ⋮ | ⋮ | ⋮ |
| ... | ... | ... | ... |

Figure 2A

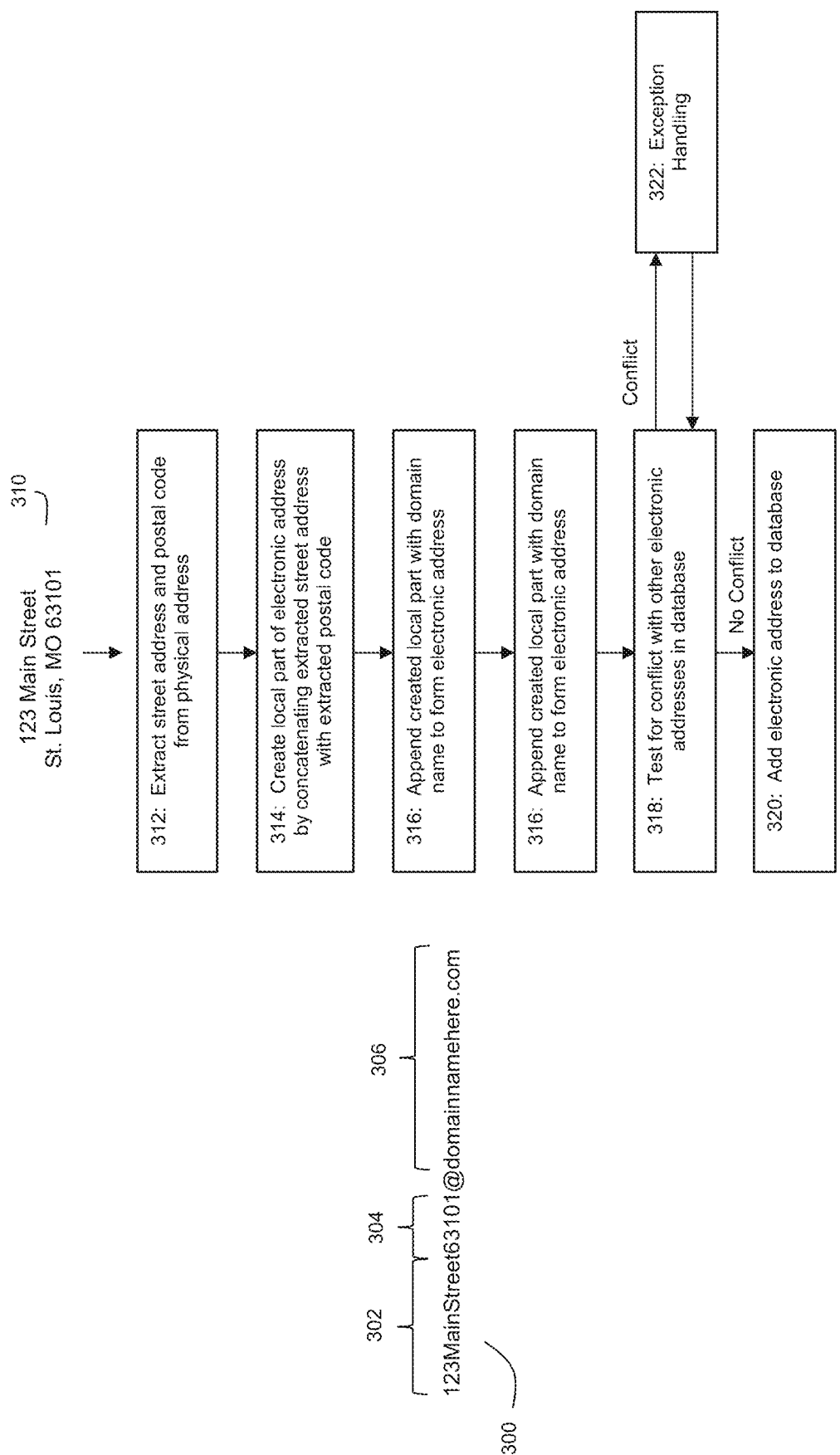

REGISTER

INDIVIDUAL ○     COMPANY ○

F. NAME [ ]     MI [ ]     L. NAME [ ]

ADDRESS   LINE 1 [                    ]
          LINE 2 [                    ]
          LINE 3 [                    ]

CITY [ ]          STATE [ ]
                  ZIP [ ]

PHONE # [ ] – [ ]
EMAIL - ADDRESS [          ]

☐ RESIDENTIAL ADDRESS
☐ BUSINESS ADDRESS

THANK YOU
    You will receive your unique
    ID via email or text

☐ VALIDATE ADDRESS
    vs. Database

SEND LOG-IN NOTIFICATION

Figure 12

SOFTWARE

- save registration (P2)
- create account for each registration
- link account to registered address
- account must have SEND and RECEIVED page/platform

Figure 13

METHODS AND SYSTEMS FOR ELECTRONIC CONTENT DELIVERY

INTRODUCTION

Technologies that provide the delivery of electronic content to users suffer from a technical shortcoming in that conventional delivery systems for electronic content typically require the senders to know the email addresses and/or the mobile numbers of the intended recipients. For example, a conventional technique for delivery of electronic content is to email the electronic content to the recipient. Of course, this technique requires that the sender know the recipient's email address. Similarly, another conventional technique for delivery of electronic content is to send a text message to a recipient's mobile device. Of course, this technique requires that the sender know the recipient's mobile number.

However, the inventor believes there is a need in the art for technology applications that allow senders to send electronic content to recipients for receipt by recipient's computing devices (e.g., desktop computers, laptop computers, mobile devices such as smart phones and tablet computers, etc.) without any requirement for the sender to know the recipient's email address or mobile number.

As a solution to this problem in the art, the inventor discloses an application of computer technology where electronic addresses are linked to physical addresses. As used herein, a physical address refers to information that identifies a physical structure within a geography such as a building, house, apartment, etc. An example of a physical address is a postal mailing address. A postal mailing address typically has a form of <Street Address>, <City>, <State>, <Postal Code>. A data structure maintained by a computer system identifies, for each of a plurality of physical addresses, an associated electronic address. Thus, each physical address will be linked via this data structure with an electronic address. It is preferred that each electronic address be unique to its associated physical address. With an example embodiment, people are associated by the computer system with physical addresses (e.g., the house or apartment at which a person receives mail), and people are only indirectly associated with electronic addresses (via their physical addresses). Thus, the links between electronic addresses and physical addresses are generally expected to be time invariant. As such, even as users change their physical addresses (e.g., moving from House 1 to House 2), such changes would not affect the links between electronic addresses and physical addresses. However, such changes would affect the links between users and physical addresses. Thus, if a user becomes associated with a new physical address because of a move, this means that the user will also become associated with a new electronic address—namely the electronic address that is indirectly associated with the user via the user's new physical address. Accordingly, unlike conventional email addresses, which are personal to a user and will remain with a user even as a user moves to a new physical address, the electronic addresses are intended to be fully transferable to new users when users change physical addresses because the electronic address is linked to a physical address and only indirectly linked to a user by virtue of a user's association with a physical address.

These data associations can be specifically applied by computer technology to drive an electronic content delivery system that allows content senders to target electronic content to desired recipients based on knowledge of physical addresses rather than knowledge about the email addresses or mobile numbers of the desired recipients. The electronic content delivery system can include accounts that are linked to users, and these accounts can store the delivered electronic content for access by users. The inventor believes this arrangement will be highly useful for many classes of content senders, including but not limited to utility service providers (who are often highly focused on providing service to specific physical addresses rather than specific people) as well as wide arrays of merchants (who often want to target their advertising and/or marketing materials on a geographic basis). As mentioned above, the content senders need only know a physical address (and/or the electronic address corresponding to that physical address) in order to achieve a delivery of electronic content to the account of the user who is associated with that physical address.

In an example embodiment, the electronic content delivery system may have a network interface through which electronic content is received. The electronic content comprises a plurality of electronic content items for receipt by a plurality of users. The plurality of users may be associated with a plurality of physical addresses. A memory also exists within the electronic content delivery system, and the memory may include a first plurality of memory addresses arranged as a plurality of accounts. Each account is associated with a user. The memory also has a second plurality of memory addresses that are arranged as a data structure that associates (1) users with accounts, (2) electronic addresses with physical addresses, and (3) physical addresses with users. As explained above, in an example embodiment, the associations between electronic addresses and the physical addresses will be generally time invariant. Thus, as people change their physical addresses, this need not have an impact on the associations between electronic addresses and physical addresses. Similarly, the associations between users and accounts will also be generally time invariant. Thus, as people change their physical addresses, the user can still remain associated with the same account in order to retain access to content that had been delivered to that account in the past. However, the associations between users and physical addresses are expected to change over time as people change physical addresses.

Through these associations in the memory data structure, the system is able to identify which accounts correspond to which physical addresses via the indirect associations that exist between these associated elements (e.g., links from (1) a physical address to a user, and (2) the linked user to an account; or links from (1) an electronic address to a physical address, (2) the linked physical address to a user, and (3) from the linked user to an account). It can be appreciated from this arrangement that when there is a change in the association between a user and a physical address, this will also cause a change in the association between that user and the electronic address associated with that user because of a change in the indirect linkage between these elements. Similarly, such a change in the association between a user and a physical address, would also cause a change in the association between that physical address and the account associated with that physical address because of a change in the indirect linkage between these elements.

The electronic content delivery system can also include a processor which cooperates with the memory and the network interface. The processor can be configured to receive a plurality of electronic content items via the network interface. Each of a plurality of the received electronic content items can have at least one of a destination physical address and a destination electronic address associated therewith. For each of the plurality of the received electronic content items, the received electronic content items may access the data structure in the memory to determine a destination account for that electronic content item based on at least one of the destination physical address and the destination electronic address for that electronic content item. The processor can then store the received electronic content items in the memory in association with the determined destination accounts.

The processor may additionally receive a plurality of account access requests from a plurality of users. For each received account access request from a user, the processor can (1) determine the account that corresponds to that received account access request, (2) verify whether that user is authorized to access the determined account, and (3) in response to a verification that the user is authorized to access the determined accounts, provide the user with access to an electronic content item that is stored by the memory in association with the determined account.

Furthermore, the processor may, in response to a notification that a user has a changed physical address, update the data structure such that that user becomes associated with the changed physical address, wherein the updated data structure causes the account associated with that user to become associated with a different electronic address, wherein the different electronic address is associated by the data structure with the changed physical address.

Furthermore, the inventor also discloses an example embodiment for a method of electronic content delivery. A computer system creates a plurality of electronic address that correspond to a plurality of physical addresses. The computer system receives registration requests from a plurality of users for access to the system. The computer system then processes the received registration request by (1) validating a physical address for the user for each of the plurality of the users, (2) associating the user for each of the plurality of the users with the electronic address corresponding to the validated physical address, and (3) creating an account for the user for each of the plurality of users. Next, the computer system notifies a plurality of content senders about the electronic address for the user's validated physical address. Then, the computer system receives a plurality of electronic content items from the content senders, wherein the received electronic content items are addressed to a plurality of the electronic addresses. Afterwards, the computer system stores the received electronic content items in the accounts for the users who are associated with the electronic addresses addressed by the received electronic content items. Then, the computer system provides users with access to the electronic content items stored in their account via a graphical user interface display. The computer system also changes which users are associated with which electronic addresses in response to users moving to new physical addresses such that a user who moves away from a previous physical address is no longer associated with the electronic address corresponding to the previous physical address. The correspondences between electronic addresses and physical addresses do not change as users move to new physical addresses.

According to another example embodiment, the inventor discloses a computer program product. The computer program product comprises a plurality of processor-executable instructions that are resident on a non-transitory computer-readable storage medium, wherein the instructions, upon execution by a processor, are configure to cause the processor to complete the series of instructions. For example, the execution of the instructions can cause the processor to create a plurality of electronic addresses that correspond to a plurality of physical addresses. The execution of the instructions can also cause the processor to receive registration requests from a plurality of users. In response to the received registration requests for each of a plurality of the users, the processor executes instructions to validate a physical address for the user, associate the user with the electronic address corresponding to the validated physical address, and create an account for the user. The computer program product may then be configured upon execution to notify a plurality of content senders about the electronic address for the user's validated physical address. The computer program product can also be configured upon execution to receive a plurality of electronic content items from content senders. The received electronic content items can be addressed to a plurality of the electronic addresses. The computer program product can further be configured to, upon execution, store the received electronic content items in the accounts for the users who are associated with the electronic addresses addressed by the received electronic content items. Then, the computer program product can be configured to, upon execution, provide users with access to electronic content items stored in their accounts via a graphical user interface display. Furthermore, the computer program product can be configured, upon execution, to change which users are associated with which electronic addresses in response to users moving to new physical addresses such that a user who moves away from a previous physical address is no longer associated with the electronic address corresponding to the previous physical address. The correspondence between electronic addresses and physical addresses do not change as users move to new physical addresses.

The inventor also believes that the systems and methods described herein constitute a significant technical improvement over conventional "paperless" statement techniques used by service providers, whereby service providers replace a paper account statement mailed to a customer's physical address with an electronic account statement emailed to a customer's personal email address after a user has consented to such paperless statements and provided his or her personal email address to the service provider. For example, the conventional "paperless" approach requires multiple interactions by the customer with multiple service providers, which places a burden on the customer so as to require the customer to provide his or her personal email address to each service provider. By contrast, with example embodiments of the system and method disclosed herein, the user need only interact with the system to, in effect, go "paperless" with numerous service providers (a "one-to-one" interaction from the user's perspective). Similarly, as a user changes his or her physical address, a "one-to-one" interaction with the system can be employed, which stands in contrast to the multiple interactions that would be required in the disjointed conventional approach to paperless account statements.

Further features and advantages of the disclosed embodiments, as well as the structure and operation of various elements of the disclosed embodiments, are described in detail below with reference to the accompanying drawings.

BRIEF DESCRIPTION OF THE DRAWINGS

The accompanying drawings, which are incorporated in and form a part of the specification, illustrate the disclosed embodiments and together with the description, serve to explain certain inventive principles. In the drawings:

FIG. 1D illustrates an example process flow for content handling logic of the system.

FIG. 1E illustrates an example process flow for request handling logic of the system.

FIGS. 2A and 2B depict additional example embodiments for associational data structures that could be used by the system.

FIG. 3 depicts an example electronic address and an example process flow for creating an electronic address from a physical address.

FIG. 12 illustrates a registration GUI for users wishing to set up and account with the electronic content delivery system in an example embodiment;

FIG. 13 illustrates a GUI of the inbox of a user account for the electronic content delivery system in an example embodiment.

DETAILED DESCRIPTION OF EXAMPLE EMBODIMENTS

Figure 1A:
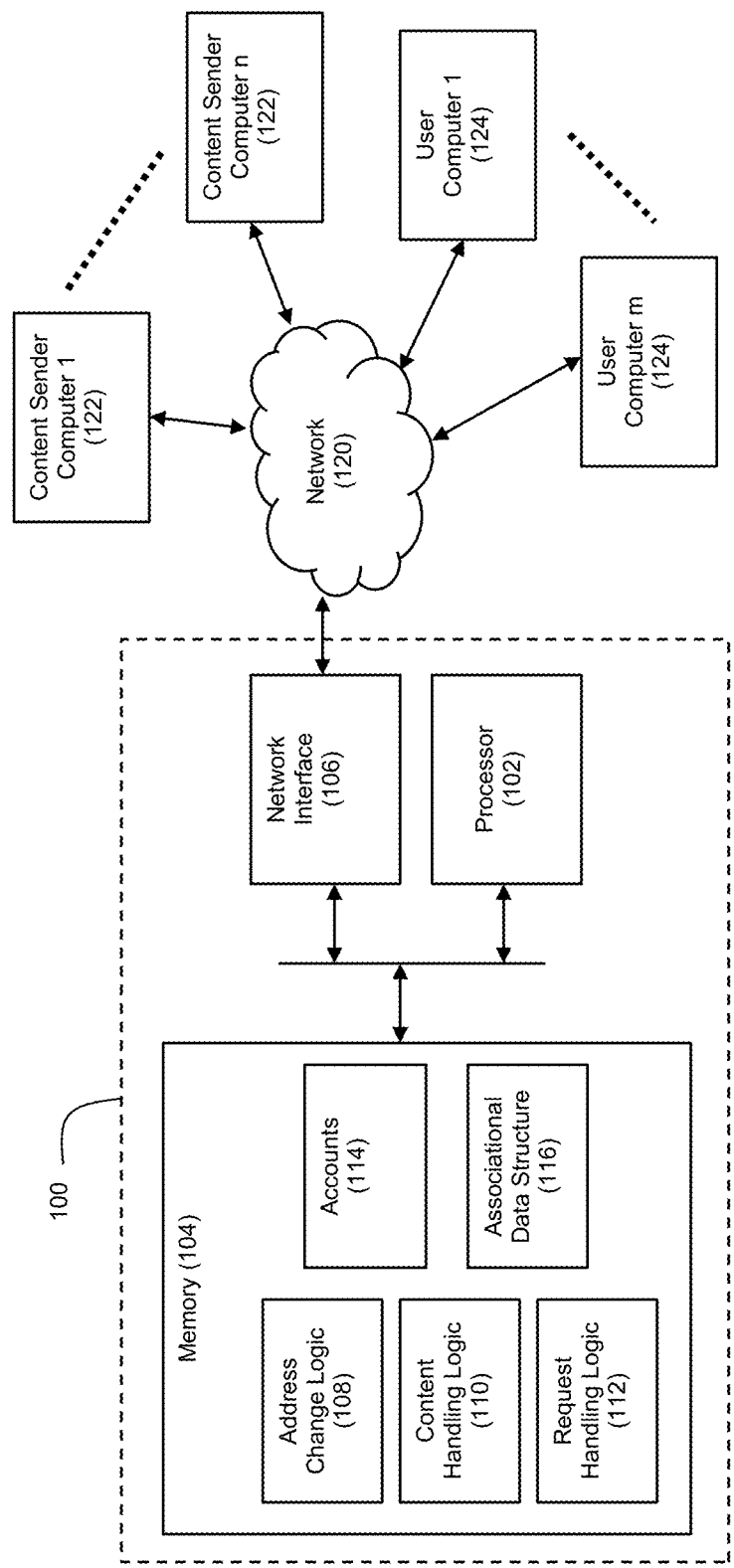
FIG. 1A illustrates an example embodiment of an electronic content delivery system.

Referring to the accompanying drawings in which like reference numbers indicate like elements, FIG. 1A illustrates an example electronic content delivery system 100. The electronic content delivery system 100 can be employed as a software-as-a-service (SaaS) platform, but may also be a software platform purchasable and licensed for use on a user's computer 124. As a SaaS platform, the electronic content delivery system 100 may be implemented as part of computer system operating as one or more servers. The computer system comprises a processor 102, a memory 104, and a network interface 106. The processor 102, memory, 104, and network interface 106 can interconnected with each other in any of a variety of manners (e.g., via a bus, via a network, etc.)

The network interface 106 can provide an interface for the system 100 to a network 120. Network 120 can be any suitable communication network or combination of communication networks, such as the Internet, wired and wireless telecommunication networks, etc. Through network 120, the electronic content delivery system 100 can interact with a plurality of content sender computers 122 and a plurality of user computers 124. The content sender computers 122 and/or user computers 124 can take the form of any suitable computer (such as a desktop computer, laptop computer, tablet computer, or smart phone) or larger computer system. The network interface 106 may take any suitable form for carrying out network interface functions, examples of which include an Ethernet interface, a serial bus interface (e.g., Firewire, USB 2.0, etc.), a chipset, and antenna adapted to facilitate wireless communication, and/or any other interface that provides for wired and/or wireless communication. The network interface 106 may also include multiple network interfaces. Other configurations are possible as well.

The processor 102 may comprise one or more processors such as general-purpose processors (e.g., a single-core or multi-core microprocessor), special-purpose processors (e.g., an application-specific integrated circuit or digital-signal processor), programmable-logic devices (e.g., a field programmable gate array), etc. that are suitable for carrying out the operations described herein.

The memory 104 may comprise one or more non-transitory computer-readable storage mediums, such as volatile storage mediums (e.g., random access memory, registers, and/or cache) and/or non-volatile storage mediums (e.g., read-only memory, a hard-disk drive, a solid-state drive, flash memory, and/or an optical-storage device). The memory 104 may also be integrated in whole or in part with other components of the system 100. Further, the memory 104 may be local to the processor 102, it should be understood that the memory 104 (or portions of memory 104) could be remote from the processor 102, in which case the processor 102 may access such remote memory through network interface 106 (or some other network interface).

Memory 104 may store software programs or instructions that are executed by processor 102 during operation of the system 100. For example, the memory 104 may store address change logic 108, which can take the form of a plurality of instructions configured for execution by processor 102 for handling changes to users' physical addresses. The memory 104 may also store content handling logic 110, which can take the form of a plurality of instructions configured for execution by processor 102 for receiving, processing, and delivering electronic content to the appropriate user accounts. The memory 104 may also store request handling logic 112, which can take the form of a plurality of instructions configured for execution by processor 102 for controlling how users are granted access to their accounts.

Memory 104 may also be configured as a database or other storage design where a set of memory addresses are arranged as a plurality of accounts 114 for users. Content intended for receipt by a user can be stored in the account 114 for that user. Other memory addresses in the memory 104 can store an associational data structure 116. Data structure 116 defines the associations that exist between physical addresses, electronic addresses, users, and accounts that allow the system to deliver content directed to a physical address and/or electronic address to the appropriate account. It should be understood that data structure 116 can be a single data structure or a plurality of data structures. It should be understood that the memory addresses used for accounts 114 or the data structure 116 need not be contiguous memory addresses. Moreover, which memory addresses are allocated to which accounts and which memory addresses are allocated to accounts versus the associational data structure 116 can be fluid and change over time as the content of memory 104 changes.

Figure 1B:
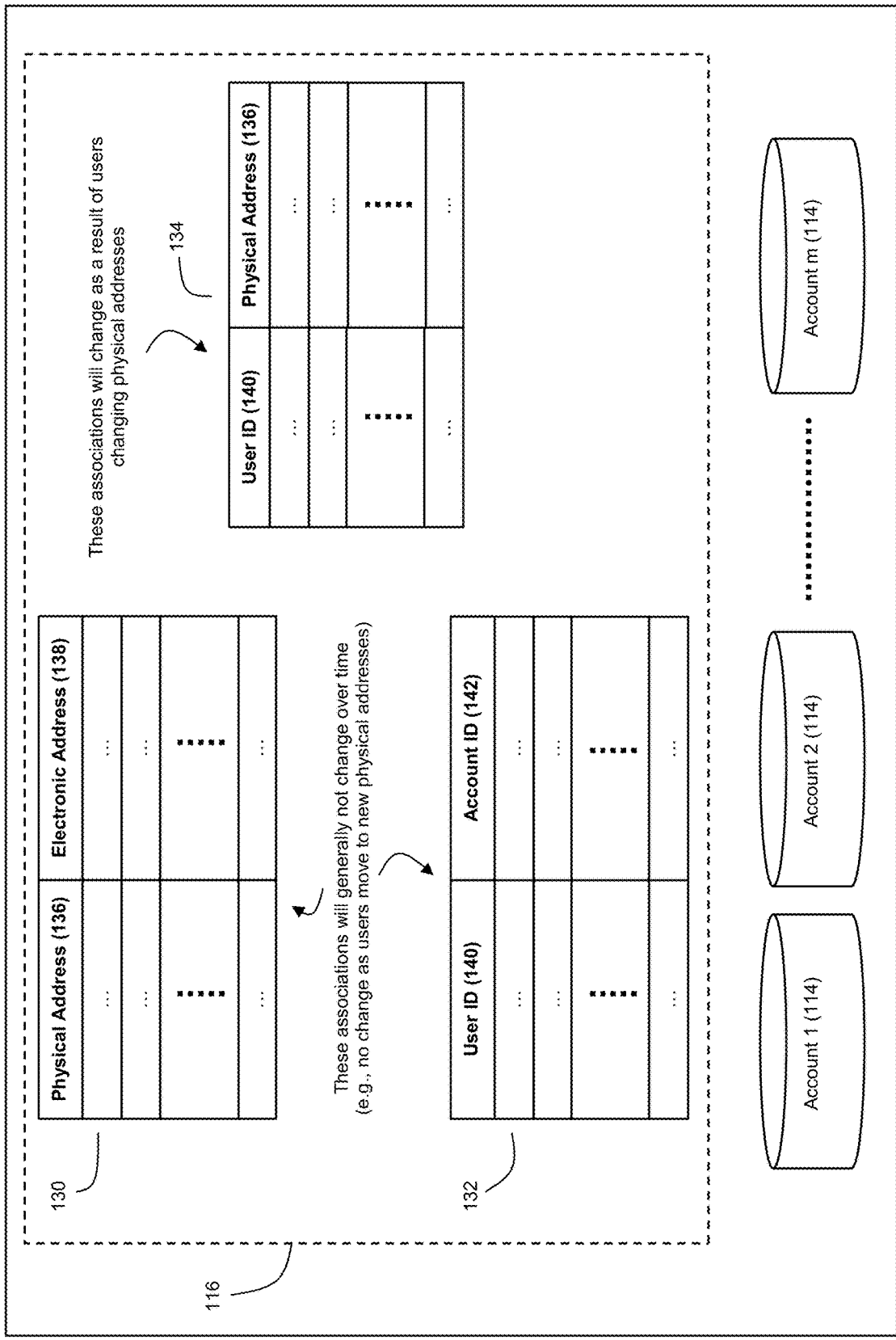
FIG. 1B illustrates an example memory arrangement for the system of FIG. 1A.

FIG. 1B shows an example of memory 104 that includes an example embodiment of data structure 116 where the data structure 116 includes a first data structure 130, a second data structure 132, and a third data structure 134. FIG. 1B also shows an example where the memory includes a plurality of accounts 114, where each account 114 can be associated with a different user.

In FIG. 1B, data structure 130 associates physical addresses 136 with electronic addresses 138. As indicated above, an example of a physical address 136 is a postal mailing address for a geographic location (e.g., a house, building, apartment, etc.). In this example, data structure 130 can be implemented as a logical table where each row in the table identifies a physical address 136 and its associated electronic address 138. Data structure 132 associates users (e.g., identified by a user ID 140) with accounts (e.g., identified by an account ID 142). Each account ID 142 can be mapped to an account 114 in the memory. In this example, data structure 132 can be implemented as a logical table where each row in the table identifies a User ID 140 and its associated Account ID 142. Data structure 134 associates users (e.g., identified by the user ID 140) with physical addresses 136. In this example, data structure 134 can be implemented as a logical table where each row in the table identifies a User ID 140 and its associated physical address 136. While data structures 130, 132, and 134 are described by way of example as being implemented as tables in memory 104, it should be understood any data structure capable of creating an associational link between data elements may be employed if desired by a practitioner (e.g., linked lists, object arrays, etc.).

As indicated above, the associations in data structure 130 between physical addresses 136 and electronic addresses 138 generally will not change over time. Thus, as people change their physical addresses, this would not impact the associations between physical addresses 136 and electronic addresses in data structure 130. Accordingly, it should be understood that the electronic address 138 corresponds to its associated physical address 136 and is not a personal email address of a user (e.g., johndoe@gmail.com or the like) because a person will retain his or her personal email address even after moving to a new physical address.

Likewise, as indicated above, the associations in data structure 132 between User IDs 140 and Account IDs 142 generally will not change over time. Thus, as people change their physical addresses, this would not impact the associations between users and accounts in data structure 132. Accordingly, users can take their accounts with them when they move to new physical addresses.

However, the associations in data structure 134 between User IDs 140 and physical addresses 136 are expected to change over time as people change physical addresses. Thus, it should be appreciated that data structures 130, 132, and 134 interrelate with each other such that accounts are indirectly associated by data structure 116 with physical addresses and electronic addresses. For example, a physical address can be linked with an account via the linkages that exist between (1) physical addresses with users, and (2) users with accounts. As another example, an electronic address can be linked with an account via the linkages that exist between (1) electronic addresses with physical addresses, (2) physical addresses with users, and (3) users with accounts. Accordingly, it should also be appreciated that a change in data structure 134 whereby a user becomes associated with a different physical address will cause data structure 116 to associate the account for that user with a different physical address and a different electronic address.

While FIG. 1B shows data structure 116 as comprising three data structures 130, 132, and 134, it should be understood that the associations (direct and indirect) defined via data structures 130, 132, and 134 could be expressed in a single data structure 116 such as the table shown by FIG. 2A. With an arrangement such as that shown by FIG. 2A, it can be understood that multiple entries in the table may be shuffled when users change physical addresses, while the linkages between (1) electronic addresses 138 and physical addresses 136, and (2) User IDs 140 and Account IDs (142) would remain the same.

Figure 2B:
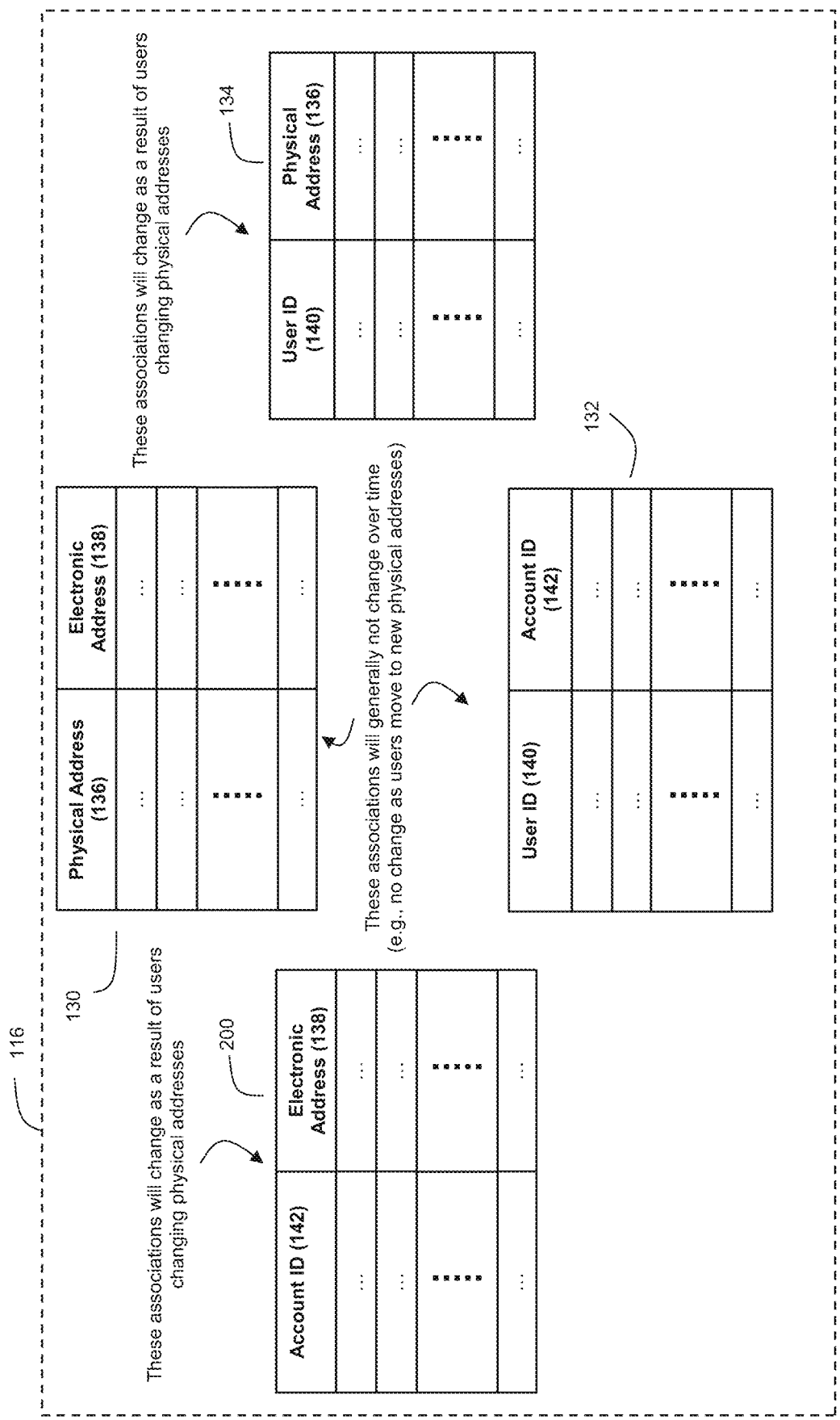

FIG. 2B shows another example data structure 116, where the data structure 116 includes data structure 200 in addition to data structures 130, 132, and 134, where data structure 200 associates electronic addresses with accounts. It should be understood that data structure 200 can be derivative of the linkages that exist in data structures 130, 132, and 134. The existence of data structure 200 allows for a direct lookup of an account from an electronic address, which may be helpful for improving speed and efficiency when processing incoming content that is directed toward a destination electronic address. Similarly, the data structure 116 could also include a similar derivative data structure that associates physical addresses with accounts, where such a data structure may be helpful for improving speed and efficiency when processing incoming content that is directed toward a destination physical address because a direct lookup of the account associated with the destination physical address can be performed.

Figure 1C:
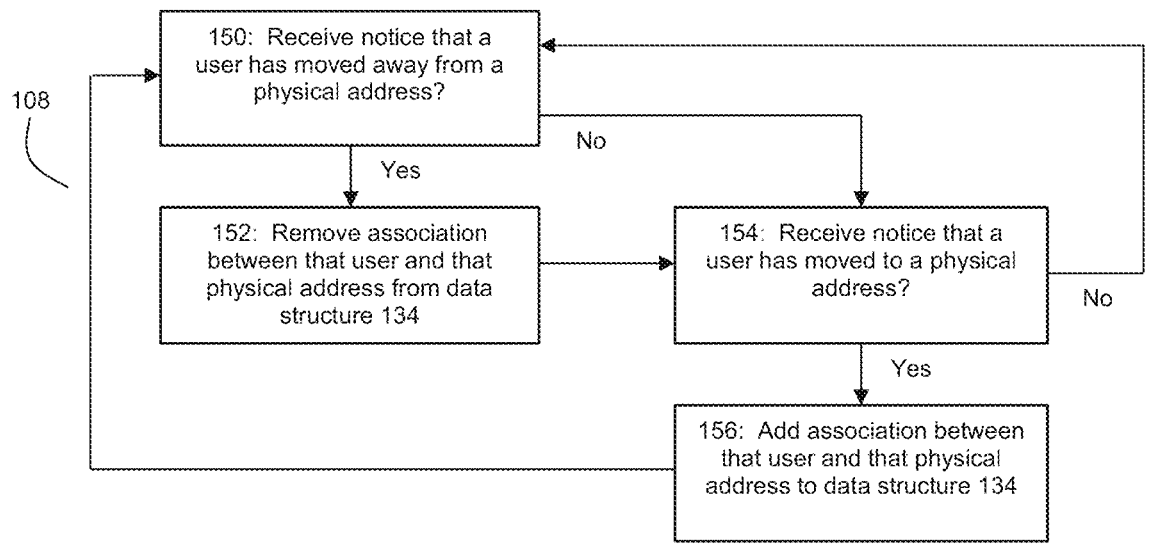
FIG. 1C illustrates an example process flow for address change logic of the system.

FIG. 1C shows an example process flow for address change logic 108. At step 150, the processor checks whether for a notice regarding a user who has moved away from a physical address. Such notices can be provided by users themselves. However, such notices can also be generated by a software program or service that monitors official records and registries regarding changes in physical addresses for persons. If step 150 results in a determination that a notice regarding a user moving away from a physical address has been received, then the process flow moves to step 152. At step 152, the processor removes the association that exists in data structure 134 between that user and that user's (now) previous physical address. This action effectively severs the link that had existed between that user and the electronic address corresponding to that previous physical address. Accordingly, any content destined for that previous physical address (or the electronic address corresponding to that previous physical address) will no longer be delivered to the account associated with that user.

Next, the processor transitions to step 154 where it checks for a notice that a user has moved to a physical address. Once again, such notices can be provided by users themselves, or they can be generated by a software program or service that monitors official records and registries regarding changes in physical addresses for persons. The process flow can also transition to step 154 when step 150 results in a determination that no notice of a "move away" has been received. If step 154 results in a determination that a notice regarding a user moving to a physical address has been received, then the process flow moves to step 156. At step 156, the processor adds between that user and the user's (new) physical address to data structure 134. This action effectively creates a new link that between that user and the electronic address corresponding to that new physical address. Accordingly, any content destined for that new physical address (or the electronic address corresponding to that new physical address) will be delivered to the account associated with that user.

FIG. 1D shows an example process flow for content handling logic 110. In the example of FIG. 1D, content received by the system 100 from a content sender computer 122 for delivery to an appropriate user account can include a destination physical address or a destination electronic address. Content item 160 is shown as including electronic content 164 and the destination physical address 166 for that content 164. Content item 162 is shown as including electronic content 164 and the destination electronic address 168 for that content 164. By allowing an identification of the destination via physical address or electronic address, the system provides content senders with more options for content delivery. However, it should be understood that a practitioner might require the content sender to address content to a recipient via only one of these techniques.

Also, it should be understood that electronic content 164 can be any form of electronic content that can be communicated to and accessed by a user. Examples of suitable types of content 164 may include documents in any suitable electronic format (e.g., pdf documents, Word processing documents, HTML documents, XML documents, etc.), images, media (e.g., audio or video), multimedia (e.g., audio and video), graphics, etc. Within these contexts, examples of content 164 that might be sent by various content senders include utility bills (such as electric bills, gas bills, etc.), and/or other bills identifying usage or services at a specific physical location (including but not limited to subscription media bills, mobile telephone bills, data service bills, credit card statement bills, mortgage bills, etc.), governmental bills and notices (such as property taxes, voting registrations or mailing, housing authority actions, responses, or other notices), advertisements or promotional/marketing material (which may include targeted advertisements/promotions/marketing to a particular geographical area in which a business operates even if the business does not know the exact names, email addresses, or mobile numbers of the occupants at a particular physical address).

At step 170, the processor handles content 164 with an associated destination physical address 16 by determining the user associated with that destination physical address. With reference to the example of FIG. 1B, step 170 can be achieved via a lookup of the User ID 140 linked to the destination physical address 136 via data structure 134.

Next, at step 172, the processor determines the destination account for the received content via a lookup of the Account ID 142 linked by data structure 132 to the user determined at step 170. Thereafter, the processor stores the content 164 in the account corresponding to the determined Account ID (step 174).

If the received content 164 includes a destination electronic address 168, the processor can execute step 176 in response to receipt of the content. At step 176, the processor determines the physical address corresponding to the destination electronic address 168 via a lookup in data structure 130 of the physical address 136 associated with the destination electronic address 138. Then, at step 178, the processor determines the relevant user via a lookup of the User ID 140 associated by data structure 134 with the physical address determined at step 176. Thereafter, the processor can perform steps 172 and 174 as described above to deliver the content to the appropriate account.

While FIG. 1D shows an example of content handling logic 110 in the context of data structures 130, 132, and 134 shown by FIG. 1B, it should be understood that the process flow steps can vary based on the nature of data structure 116. For example, if derivative data structures such as data structure 200 described above in connection with FIG. 2B are used, direct lookups can be used to identify the appropriate destination account based on the received destination physical address 166 or destination electronic address 168.

FIG. 1E shows an example process flow for request handling logic 112. In the example of FIG. 1E, an account access request 180 from a user computer 124 can include data 182 associated with the requesting user. Such data 182 can include an identification of the user who has made the request 180 (e.g., a User ID) as well as authorization information for the user (e.g., a password for the user's account). At step 184, the processor determines the account for the requesting user 182 via a lookup in data structure 132 of the Account ID 142 associated with the User ID 140 for the requesting user 182. At step 186, the processor determines whether the requesting user is authorized to access the determined account. For example, this authorization check can determine whether a password provided by the user matches with a password that is stored by memory 104 in association with the subject account. However, it should be understood that any suitable authorization verification technique could be used (e.g., fingerprint verification via a touchscreen or similar sensor, other biometric verification, etc.). If step 186 results in a verification that the user is authorized to access the determined account, the processor provides the user with access to the determined account at step 188. This step can involve providing the user with access, via the user's user computer 124, to a graphical user interface (GUI) that displays one or more content items stored in the relevant account. If step 186 results in a conclusion that the user is not authorized to access the determined account, the processor can reject the access request.

As mentioned above, the electronic address used by the system 100 corresponds to a physical address. FIG. 3 depicts an example syntax for an electronic address 300 in this regard. In the example of FIG. 3, electronic address 300 exhibits an email address syntax which takes the form of a text string. This text string can include a local part followed by a domain name part as is conventional for email addresses. The local part includes a text string portion 302 that corresponds to the street address of the corresponding physical address (e.g., 123 Main Street) (where white spaces can be omitted from the text string). The local part also includes a text string portion 304 that corresponds to the postal code of the corresponding physical address (e.g., the 5 digit portion of a postal code such as 63101 as shown in the example of FIG. 3). The street address portion 302 and the postal code portion 304 can be concatenated together as shown in FIG. 3 to create the local part of the electronic address 300. The domain name part 306 of the electronic address can reflect a domain name used by an operator of system 100. While in the example of FIG. 3 the electronic address syntax is an email address syntax, it should be understood that this need not be the case; although the email address syntax is preferred as it allows for an embodiment where a content sender is able to (1) figure out an appropriate electronic address for use with the system by virtue of knowing the relevant physical address, and/or (2) use the existing legacy delivery systems for emails to electronically send content from a content sender computer 122 over a network 120 to the system 100.

FIG. 3 also discloses an example process flow that can be executed by a computer system to create electronic addresses from physical addresses. The input to the process flow can be a physical address record 310. As an example, the physical address record 310 can be in a postal address syntax (such as street address, city, state, postal code). However, other representations of physical addresses could be supported if desired by a practitioner.

At step 312, the computer system extracts the street address and postal code from the physical address record 310. Optionally, the street address may include an apartment or unit number if multiple dwellings are located at a particular street address. Also, the extracted postal code can be the 5 digit postal code used in the United States if desired by a practitioner; although some practitioners may want to use the longer 9 digit postal code used in the United States. It should also be readily understood that the process flow of FIG. 3 (and system 100) could be readily employed in countries outside the United States using any physical address conventions of such countries.

At step 314, the computer system concatenates the extracted street address with the extracted postal code to create the local part of the electronic address. This operation may include eliminating any white space between characters, and the street address can be positioned before the postal code in the local part. Thus, the physical address of 123 Main Street, St. Louis, Mo. 63101 becomes a local part of "123MainStreet63101". The city/state portion of the physical address can be omitted from the electronic address if desired by a practitioner. As another example, a physical address of 200 Elm Street Apartment B, St. Louis, Mo. 63101 can be converted at step 314 into a local part of "123ElmStreetUnitB63101". Thus, a practitioner can design the FIG. 3 process flow to convert an apartment/suite number in a street address into a "Unit<X>" text string that falls between the primary street address and the postal code in the local part.

At step 316, the computer system appends the domain name part to the local part created at step 314 to form the electronic address corresponding to the physical address in record 310 (see electronic address 300 in FIG. 3).

Next, at step 318, the computer system can check for a conflict with any other electronic addresses that have been created by the system. Previously created electronic addresses can be stored in a database, and step 318 can operate to detect whether the electronic address created at step 316 matches with any electronic addresses already in the database (where such previous electronic address corresponds to a different physical address). If so, a conflict exists because it is desirable for an example system to avoid using the same electronic address with different physical addresses. If a conflict exists, the process flow can proceed to step 322 where exception handling is performed to resolve the conflict. Any of number of conflict resolution schemes can be executed at step 322. For example, the system could add an additional character at a predefined location of the new electronic address to remove the conflict (so long as the adjusted electronic address does not itself conflict with another electronic address in the database). For example, step 322 could operate to add a hyphen (or other character) and a sequentially increasing number to the end of the local part in order to resolve conflicts (e.g., "123MainStreet63101" could become "123MainStreet63101-2" in order to resolve a conflict). As another example, if the use of the 9-digital postal code for the subject physical address would resolve the conflict, step 322 could operate to include the 9-digital postal code as text string portion 304. As another example, an administrator could determine whether the physical address tied to the previously existing electronic address is still a valid physical address. If it is no longer a valid physical address, the previous electronic address could be deleted from the system, which would then remove the conflict. Once the system is satisfied that the new electronic address does not conflict with a previous electronic address, the new electronic address can be added to the database (step 320). Step 320 may involve adding an entry to data structure 130 that associates the new electronic address with the physical address from record 310.

If desired by a practitioner, the process flow of FIG. 3 can be performed iteratively over a large set of physical address records 310 in order to assemble data structure 130 in advance of any specific need for an electronic address by a user. For example, a computer system can convert all physical addresses known in a geographic area (e.g., the United States) into a plurality of electronic addresses and build data structure 130 accordingly. However, a practitioner might also choose to execute the FIG. 3 process flow on an as needed basis where each time a user registers himself or herself with the system, the system will create an electronic address from that user's physical address. As part of this, a practitioner may want to implement a validation process for validating that the user has an appropriate tie to the physical address in question. For example, a practitioner may require a user to provide some form of proof of residency or ownership with respect to a physical address (e.g., that the physical address in question is listed on the user's driver's license, that the user can provide two forms of mail from utilities that show the user receives mail at the subject physical address, etc.). This validation could also involve cross-checking a user's proposed physical address against governmental or other third party records (e.g., the United States Postal Service address database, a phone book database, etc.). Furthermore, even if this validation process is not performed when an electronic address is created, a practitioner may choose to implement such a validation process when a user attempts to register himself or herself with a physical address in the system.

While FIG. 3 shows an electronic address local part that exhibits a structure of <Street Address><Postal Code>, it should be understood that other structures could be used if desired by a practitioner. For example, the structure could include a period between the concatenated street address and postal code (<Street Address>.<Postal Code>, e.g., "123MainStreet.63101"). As another example, the structure could include a state at the end of the concatenation (with or without periods) (e.g., "123MainStreet63101MO", "123MainStreet.63101.MO", etc.). Still other examples for possible structures and content for the electronic address local part are discussed below.

It should also be understood that a practitioner might find it desirable to tie multiple electronic addresses to the same physical address. For example, two people may share the same address (e.g., roommates in a home or apartment; parents and children living in the same home/apartment, etc.). To allow each user to receive electronic content sent to a particular physical address, the system could also generate the electronic addresses in a manner that reflects the name of a person at the physical address. For example, if we imagine that John Smith and Jane Doe both reside at 123 Main Street, St. Louis, Mo. 63101, the FIG. 3 process flow can be augmented to generate the electronic address from both a user name and a physical address. Continuing with this example, the system could generate electronic address local parts such as "John.Smith.123MainStreet63101" and "Jane.Doe.123MainStreet63101". Should either of these people later change their physical address (e.g., John Smith moves to a new physical address), then the data structures can be updated in a manner that de-links that user (and his/her account) from the electronic address corresponding to that physical address (e.g., delinking "John.Smith.123MainStreet63101" from John Smith and his account). Thus, if a bill (such as a cell phone bill) is sent electronically by a content sender to only one user at a particular physical address, the system can either require the content sender to direct the electronic bill to the electronic address of the specific user or the system can resolve both the physical address and name of the intended recipient to the appropriate electronic address (and linked account) for the desired recipient. Furthermore, it should be understood that the user name portion of the local part could be a user-defined handle or the like (e.g., if John Smith has a user name or handle of "BestJohn", the local part could be "BestJohn.123MainStreet63101" if desired by a practitioner.

Moreover, it should also be understood that a practitioner may want to formulate the electronic addresses in a manner that conceals the precise physical address with which the electronic address is associated. To do so, the system can generate a unique local part for electronic address that does not include either or both text string portions 302 and 304 (e.g., "123MainStreet63101" can become local parts "xyz.63101" or even more simply "xyz"). Similarly, in instances where a user name is part of the electronic address, the system could conceal the street address by shortening the local part to something like "<USER NAME>.<POSTAL CODE>" or the like (e.g., continuing from the example above, "John.Smith.63101" or "BestJohn.63101" etc.).

Figure 4A:
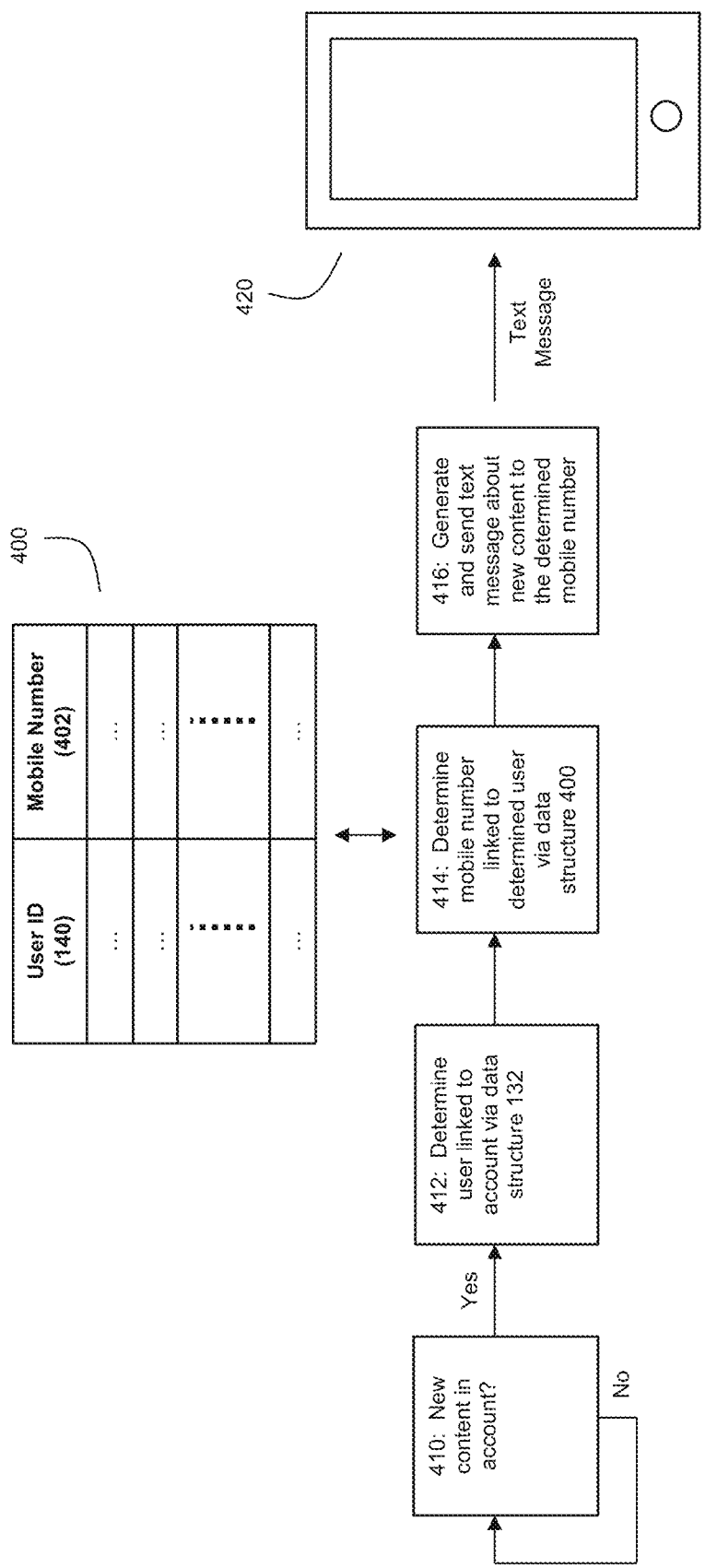
FIGS. 4A-C depict example process flows showing how the system can automatically notify users about new content.
Figure 4B:
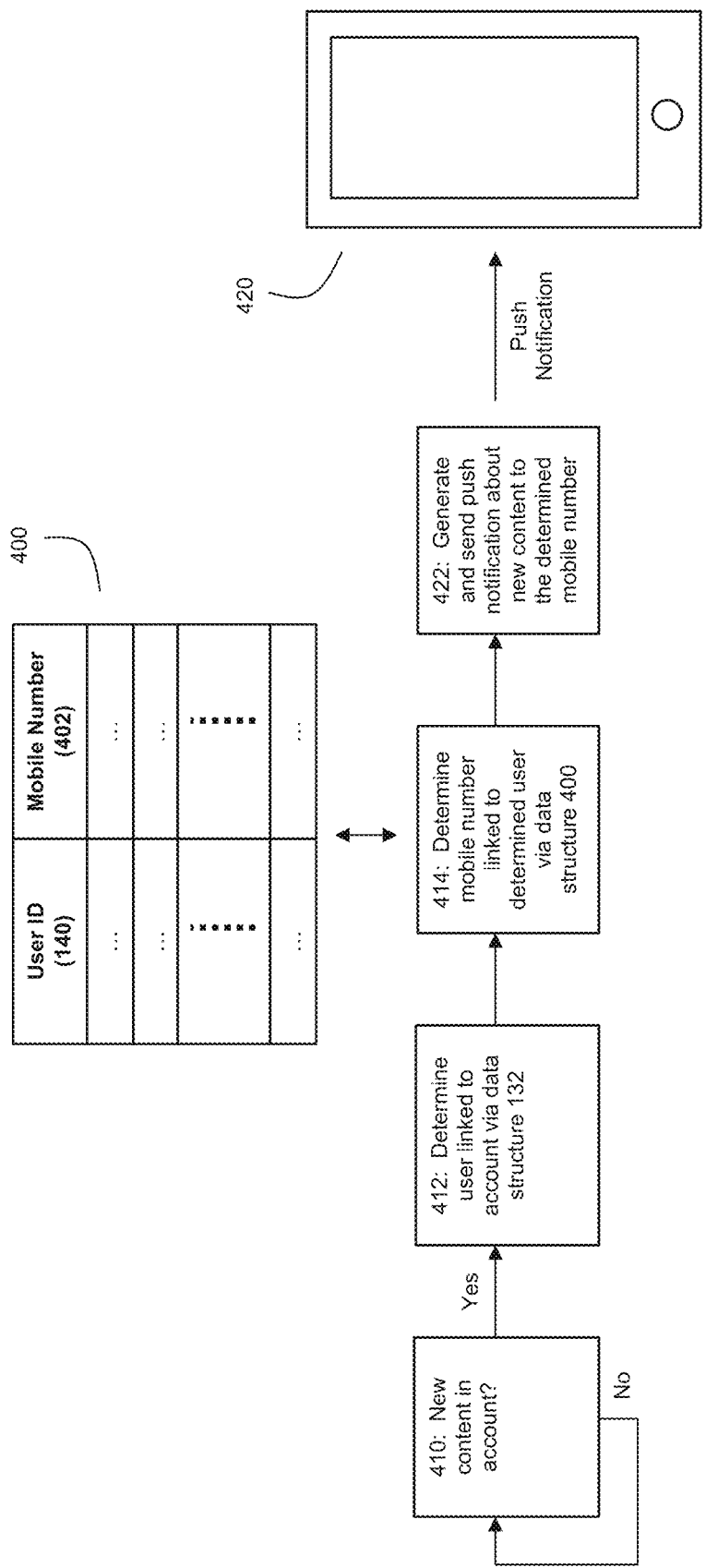
Figure 4C:
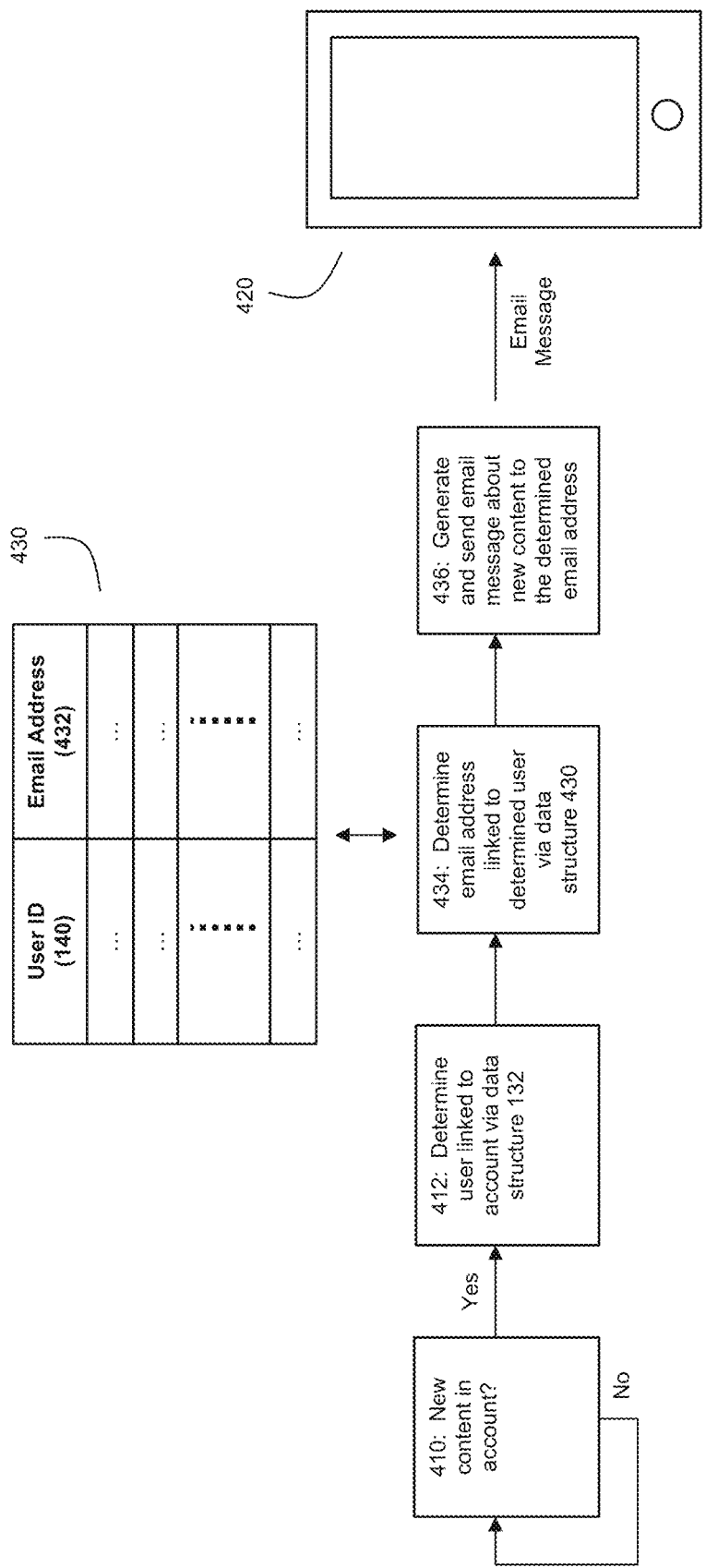

In another example embodiment, the system 100 can support a delivery of electronic notifications to users when new content has been added to their accounts. FIGS. 4A-4C show examples of notification techniques that can be used in connection with system 100.

FIG. 4A shows an example where the addition of new content in a user's account triggers a delivery of a text message to that user. To support such an operation, the memory 104 can also include a data structure 400 that associates User IDs 140 with mobile numbers 402. For example, as part of a registration process, a user can provide his or her mobile telephone number to the system, and this mobile number can be associated with the user via data structure 400. Then, system 100 can execute software that detects when new content has been added to an account (step 410). Upon detection of new content in an account, the process flow proceeds to step 412. At step 412, the system determines the user associated with that account via the linkages in data structure 132. Then, at step 414, the system determines the mobile number linked to the user determined at step 412 via the linkages in data structure 400. At step 416, the system generates and sends a text message to the mobile number determined at step 414, where this text message is configured to notify the user of mobile device 420 about the existence of the new content. For example, the text message can be a text string that reads "You have new content available in your NAMEHERE account. Please go to LINKHERE to access this new content", where NAMEHERE is the name of the content delivery service and where LINKHERE is a user-selectable link that would cause the user's mobile device 420 to electronic access the service available from NAMEHERE. Optionally, this text message can include a link to the new electronic content itself if desired by a practitioner. For example, if the electronic content is a pdf or the like of a new utility bill for a user, the text message can include a link to the pdf document that constitutes the new electronic content. Upon selection of the link, the user's computer 420 can then display this pdf document.

FIG. 4B shows an example where the addition of new content in a user's account triggers a delivery of a push notification to a mobile application (an "app") that is resident on the mobile device 420 of that user. Accordingly, the process flow of FIG. 4B is best used in connection with an example embodiment where a practitioner has created an app for use by system users to gain access to their accounts. With the FIG. 4B example, once again, data structure 400 is used to determine the mobile number 402 linked to a given user. Steps 410-414 operate as they would in connection with FIG. 4A, but rather than resulting in a text message, these steps result in the generation and sending of a push notification to the mobile device 420 of the relevant user (e.g., a smart phone or tablet computer). The mobile device 420 would then notify the user through the relevant app or a notification service of the mobile device 420 that new content is available in the user's account.

FIG. 4C shows an example where the addition of new content in a user's account triggers a delivery of email to the email address that is associated with a user. To support such an operation, the memory 104 can also include a data structure 430 that associates User IDs 140 with user email addresses 432. For example, as part of a registration process, a user can provide his or her email address to the system, and this email address can be associated with the user via data structure 430. It is worth repeating that email address 432 would be email address that is personal to the user as opposed to the electronic address 138 (which corresponds to a physical address rather than a specific user). With the process flow of FIG. 4C, steps 410 and 412 would proceed as they would for FIGS. 4A and 4B. Then, step 434 is similar in nature to step 414, but where data structure 430 is accessed to find the email address 432 linked to the subject user. Then, at step 436, the system generates and sends an email notification about the new content to the email address determined at step 434. This email message can be structured in a fashion similar to the text message discussed above in connection with FIG. 4A. Also, like the text message of FIG. 4A, this email may optionally include a link to the new electronic content itself. The email message may also or alternatively include the electronic content itself directly in the body of the email or as an attachment). Thus, it should be understood that from the perspective of the user, the system 100 can operate transparently such that the user will continue to receive his or her electronic content via his or her personal email address as he or she does for other content (although from the perspective of the content sender, system 100 is what allows a content sender to reach a user even without knowledge of the user's email address). Moreover, while FIG. 4C shows the user computer in the form of a mobile device 420, it should be readily understood that other forms of computers could receive this email message, such as a desktop computer, laptop computer, etc.

Also, if desired by a practitioner a filter can be employed by the system to determine which items of new content will trigger automated notifications to users as per any of FIGS. 4A-C. For example, if a practitioner chooses to implement system 100 in a manner that permits content senders to send unsolicited content to users, that practitioner may also want to provide users with an ability to avoid the generation of automated notifications for certain classes of new content. This filter can be a user-defined filter whereby a user identifies criteria for use by the system to determine if new content will trigger an automated notification. As an example, users can define specific content senders for which an automated notification will be triggered when such content senders send new content. As another example, users can define specific content senders for which no automated notifications will be triggered when such content senders send new content. As another example, a user could define a filter that will trigger automated notifications for new content that is classified as a bill (e.g., a utility bill) but prevent notifications for new content that is classified as marketing material or advertising. As another example, the filter can define certain merchants as being permitted to send advertising/promotional content that will trigger an automated notification while preventing other merchants from triggering automated notifications (e.g., permitting an automated notification when a favorite restaurant is sending out a promotion). Accordingly, the process flows of FIGS. 4A-4C may include an additional step where the user-defined filter is tested to determine whether the new content is the type of content for which an automated notification will be sent.

Figure 5:
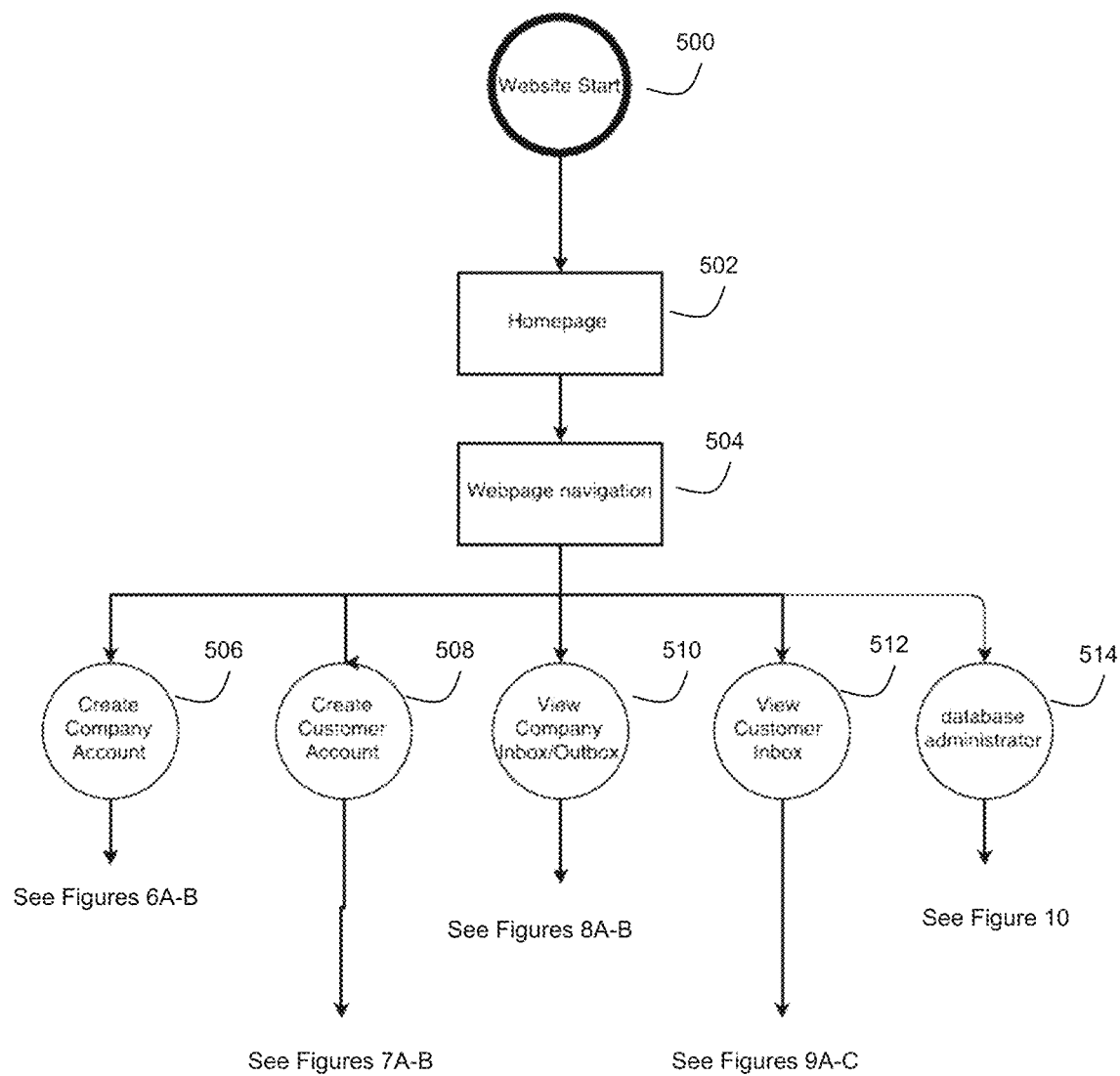
FIG. 5 illustrates a high level flow chart where a user can access the electronic content delivery system according to an example embodiment.

Additional Details Regarding an Example Content Delivery System 100:

The electronic content delivery system 100 can be configured to provide a user with access to content through a graphical user interface (GUI). In FIG. 5, a high level flow chart is shown which describes how a user can access the electronic content delivery system 100. Via a user computer 124, the user may access the electronic content delivery system 100 through a registered domain name for website access 500. As mentioned above, in some other embodiments, the user computer 124 may contain a mobile application (or other client software) which enables the user to directly access the electronic content delivery system 100 without first logging into the system 100 through website access. But, it should be understood that the website can be accessed by a user computer 124 via conventional browser software or the like. After accessing the website 500, the user is directed to a homepage screen 502. The homepage screen 502 may have identifying credentials for input by the user as well as general information regarding the electronic content delivery system 100. Once the user enters the correct credentials for verification, the user is taken to a webpage navigation screen 504 where the user may access the accounts to which the user is deemed verified. However, if the user is not a registered user with the electronic content delivery system 100, the user may have a clickable option to communicate to the electronic content delivery system 100 that the user wishes to set up an account. On the webpage navigation screen 504, a table or clickable listing of items is presented for user interaction. Here a user, may choose to create a company account 506 (e.g., become a content sender) or create a customer account 508 (become a user). These can be the only two options available to the user if the user is not verified or does not have access to any current accounts of the electronic content delivery system 100. If the user does have access to at least one account, the webpage navigation screen 504 can include additional options where the user may select to view the company's inbox/outbox 510 or view the customer inbox 512. These viewing options are dependent on whether the user's accounts are determined to be a company account 506 or a customer account 508 (e.g. a content sender or a user in the context of FIG. 1A). In an example embodiment, only company accounts 506 are envisioned to have access to outboxes to see what type of electronic content items (i.e. bills, coupons, etc.) have been sent to particular users by the account. In future iterations of the electronic content delivery system 100, the outbox option may be available to customers as well. However, certain restrictions may be placed on customers who are not companies as to the types of outgoing electronic content items may be sent.

Additionally, the webpage navigation screen 504 may have an option where a database or system administrator 516 can access the electronic content delivery system 100. The database or system administrator my enter the electronic content delivery system 100 after a verification of credentials to perform an large number of maintenance or service based tasks. The database or system administration 516 is a user who is authorized by the electronic content delivery system 100 and who has special access to directly modify the data storage or databases as well as its access parameter in order to resolve errors, fix bugs, destroy hacks, create new data to be used by the system, or any other operational tasks germane to the execution an operation of the electronic content delivery system 100. Access by the database or system administrator will be detailed below with respect to FIG. 10.

Figure 6A:
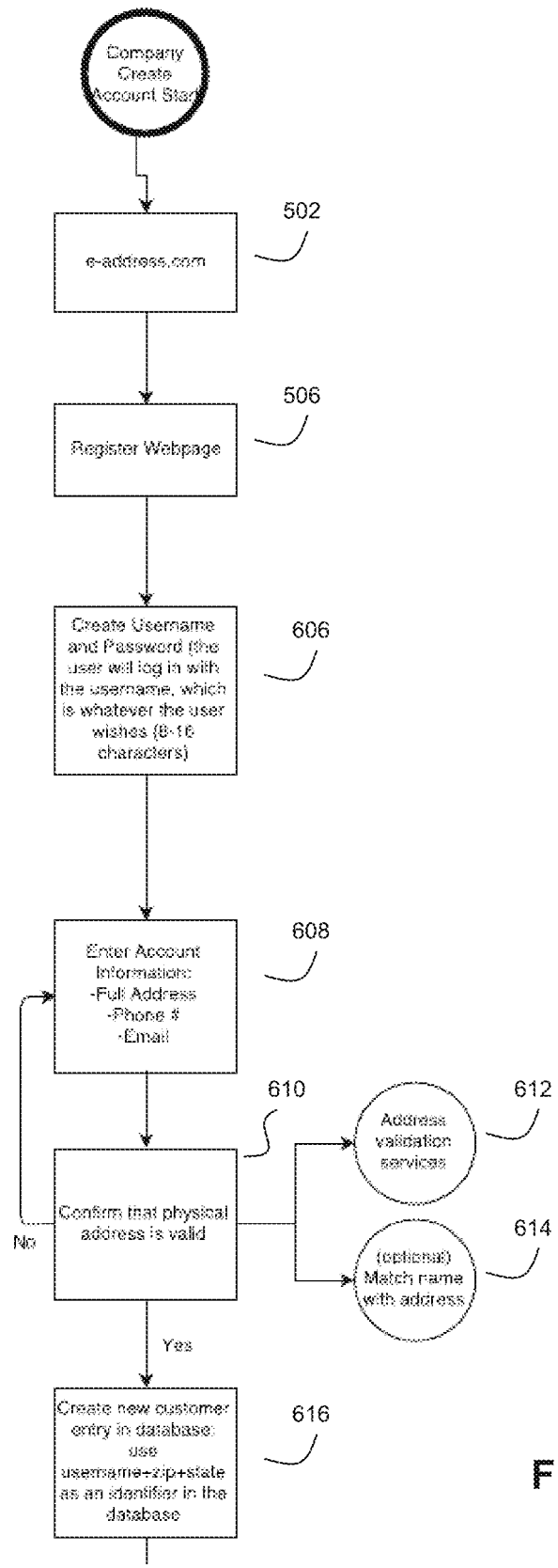
FIGS. 6A and B illustrate an example operational flow path for a user attempting to set up a company account within the electronic content delivery system.
Figure 6B:
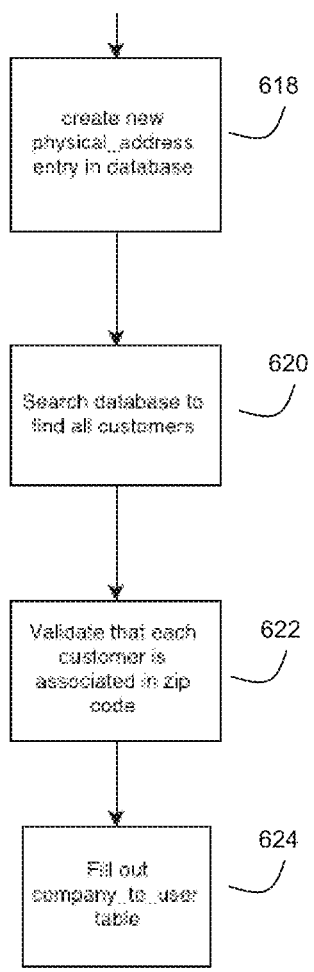

Turning now to FIGS. 6A and 6B, the create company account option 506 of the electronic content delivery system 100 will be discussed in greater detail. FIGS. 6A and 6B show an operational flow path for a user attempting to set up a company account 506 within the electronic content delivery system 100. After entering the homepage 502 and selecting the create company account option 506 from the webpage navigation screen 504, the user is prompted via his or her computer to create a username and password 606 that will allow the user access to the company account 506. The inputted information from the user's computer is transmitted to the electronic content delivery system 100 through the network interface 106 and evaluated by the electronic content delivery system 100 to ensure that certain protectable parameters of the password entered are consistent with the password requirements needed by the electronic content delivery system 100. If the password if found to be non-compliant, the user is prompted to enter a new password. Once the verification of the password and username is complete and stored within the data storage, the user is prompted via a GUI presented on the user's computer to enter account information 608 related to the newly registered company account. This information may include identifiable information such as company name, full address information, a company telephone or contact number, and a corresponding email address for the company or the individual assigned for management of this particular company account.

After the information regarding the company representative of the company account is entered into and stored within the electronic content delivery system 100, the electronic content delivery system 100 attempts to confirm that the physical address information 610 of the company is indeed a valid physical address. To perform this validation, the electronic content delivery system may access a second or outside database to retrieve information relating to the company identified by the new user. These database may provide address validation services 612 to confirm that the information entered for the new company account matches that of other databases with properly recorded company identifiable information. Additionally, the validation with the second or outside database can include matching the name and address 614 of the company with any other known names and address for that company to ensure that the entered information is correct and accurate. If the entered information is deemed inaccurate, by either a non-existent physical address or by an incorrect physical address against the second or outside database's address for the existing company, an error is created within the electronic content delivery system 100 and the user is redirected the enter account information stage 608 to re-enter the correct company information and/or address. However, if the company information is deemed to be correct, the electronic content delivery system 100 creates a new customer entry (see 616) within memory 104 which identifies the company.

Also with the verification that the company information is correct, the new customer entry at 616 creates an electronic address for that particular company (see FIG. 3 for an example of how this can be performed). Afterwards, at 618, a new physical address entry is also created in memory 104. The physical address is then associated via data structure 130 with the electronic address for the new company that was recently activated.

From this point onward the company account might have some additional information and options available to it that is not available to a normal customer account. The newly created company account may have a search option 620 which would allow the user accessing the company account the ability to search the electronic content delivery system's memory 104 to identify potential customers based on specific search parameters. For example, the user of the company account may search for all potential customers within a specific zip code who are registered with the electronic content delivery system 100. Of course other search parameters, such as state, city, or customer surnames will also be available to the company account user. Once a search is performed and the results are obtained, the electronic content delivery system 100 will validate each search result at 622 to confirm that the search results fit within and are acceptable returns for the executed search. After the search results are validated at 622, the electronic content delivery system 100 then creates a company-to-customer table at 624 for the search parameters. The company-to-customer table is accessible by the user of the company account to send those customers identified in the company-to-customer table an electronic content item of the company's choice. Once sent by the company account, the electronic content item will appear in the customer's account inbox (see 512) for viewing and or any other required customer interactions.

Figure 7A:
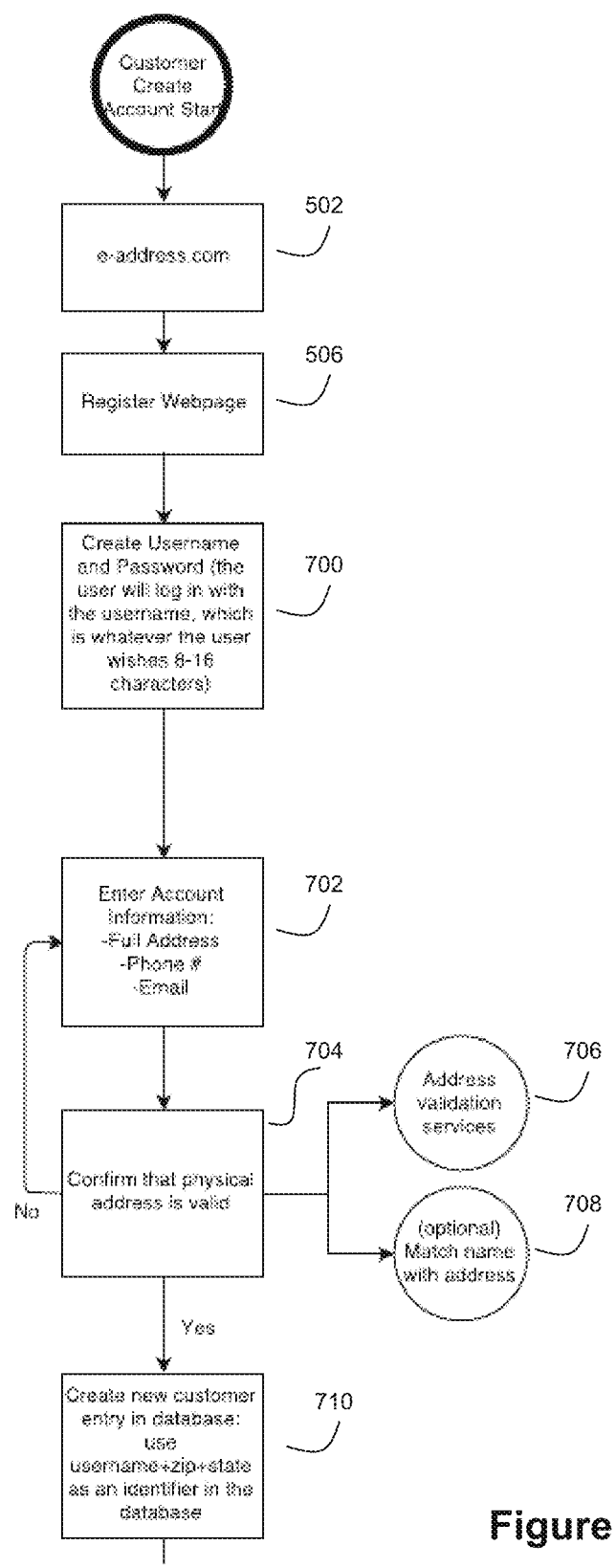
FIGS. 7A and 7B illustrate an example operational flow path for a user attempting to set up a customer account within the electronic content delivery system.
Figure 7B:
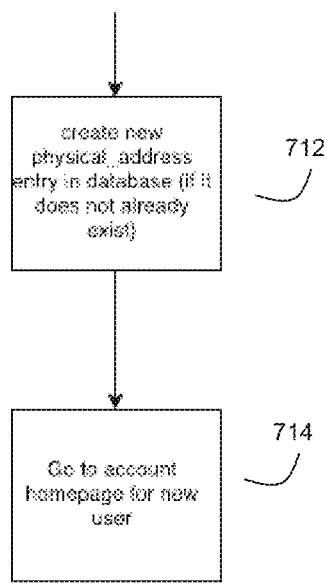

Looking now at FIGS. 7A and 7B, the create customer account option 508 of the electronic content delivery system 100 is shown. Similar to the create company account option 506, FIGS. 7A-B show an operational flow path for a user attempting to set up a customer account within the electronic content delivery system 100. After entering the homepage 502 and selecting the create customer account option 508 from the webpage navigation screen 504, the user is prompted via his or her computer to create a username and password at 700 that will allow the user access to the customer account. The inputted information via the GUI presented on the user's computer is transmitted to the electronic content delivery system 100 through the network interface 106 and evaluated by the electronic content delivery system 100 to ensure that certain protectable parameters of the entered password are consistent with the password requirements needed by the electronic content delivery system 100. If the password if found to be non-compliant, the user is prompted to enter a new password. Once the verification of the password and username is complete and stored within memory 104, the user is prompted via the GUI presented on the user's computer to enter account information at 702 related to the newly registered customer account 508. This information may include identifiable information such as customer name, full address information, a customer telephone or contact number, and a corresponding email address for the customer of the account.

After the information regarding the customer account is entered into and stored within the electronic content delivery system 100, the electronic content delivery system 100 attempts at 704 to confirm the physical address information of the customer is indeed a valid physical address. To perform this validation, the electronic content delivery system may access and second or outside database to retrieve information relating to the customer identified by the user. These databases may provide address validation services 706 to confirm that the information entered for the new customer account matches that of other databases with properly recorded customer identifiable information. Additionally, the validation with the second or outside database can include at 708 matching the name and address of the customer with any other know names and address for that customer to ensure that the entered information is correct and accurate. If the entered information is deemed inaccurate, by either an non-existent physical address or by an incorrect physical address evaluated against the second or outside database's address for the existing customer, an error is created within the electronic content delivery system 100 and the user is redirected the enter account information stage to re-enter the correct customer information and/or address. However, if the customer information is deemed to be correct, the electronic content delivery system 100 creates at 710 a new customer entry within memory 104 which identifies the newly registered user. As mentioned above, the physical address validation may also include a step of confirming not only that the physical address is a valid physical address, but also that the user has a sufficient connection with the physical address to justify that user receiving content destined for that physical address (e.g., proof of residency, etc.).

Also with the verification that the customer information is correct, the new customer entry creates an electronic address for that particular customer at 710 (see FIG. 3). Afterwards, a new physical address entry is also created at 712 in the memory 104. The physical address is then associated via data structure 130 with the electronic address for the new customer account that was recently activated.

From this point onward the customer account does not have the same accessible searching rights as a company account 506. After the physical address of the new customer account is created and matched with the electronic address, the user of the customer account is returned at 714 to the homepage of the electronic content delivery system 100. From here, the user is able to access his/her inbox 512 to view whatever messages or electronic content items are available to that particular customer account. Once the customer account is created it becomes part of the searchable database of the electronic content delivery system 100. Subsequent searches by the company accounts may produce different tables and results as more and more users become registered with the system. Additionally, the electronic content delivery system 100 may be able to update these search results and company-to-customer tables automatically as new customer accounts are created which meet the search parameters. It is envisioned that future embodiments of the electronic content delivery system 100 may have the search mechanism available to customer accounts to determine additional companies which may provide the customer with electronic content items of interest.

Figure 8A:
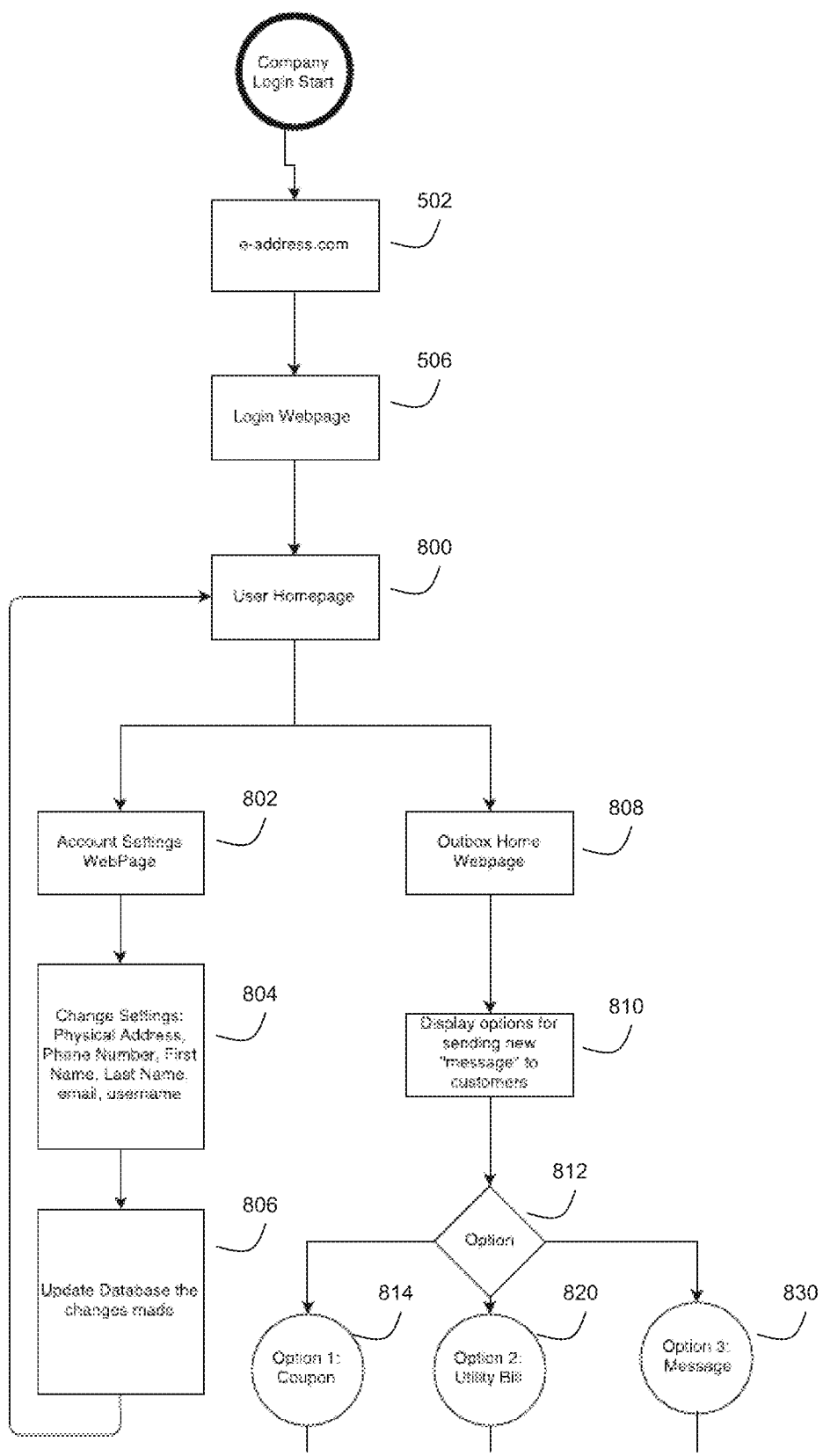
FIGS. 8A and 8B illustrate an example flow chart of a user accessing a company account of the electronic content delivery system.
Figure 8B:
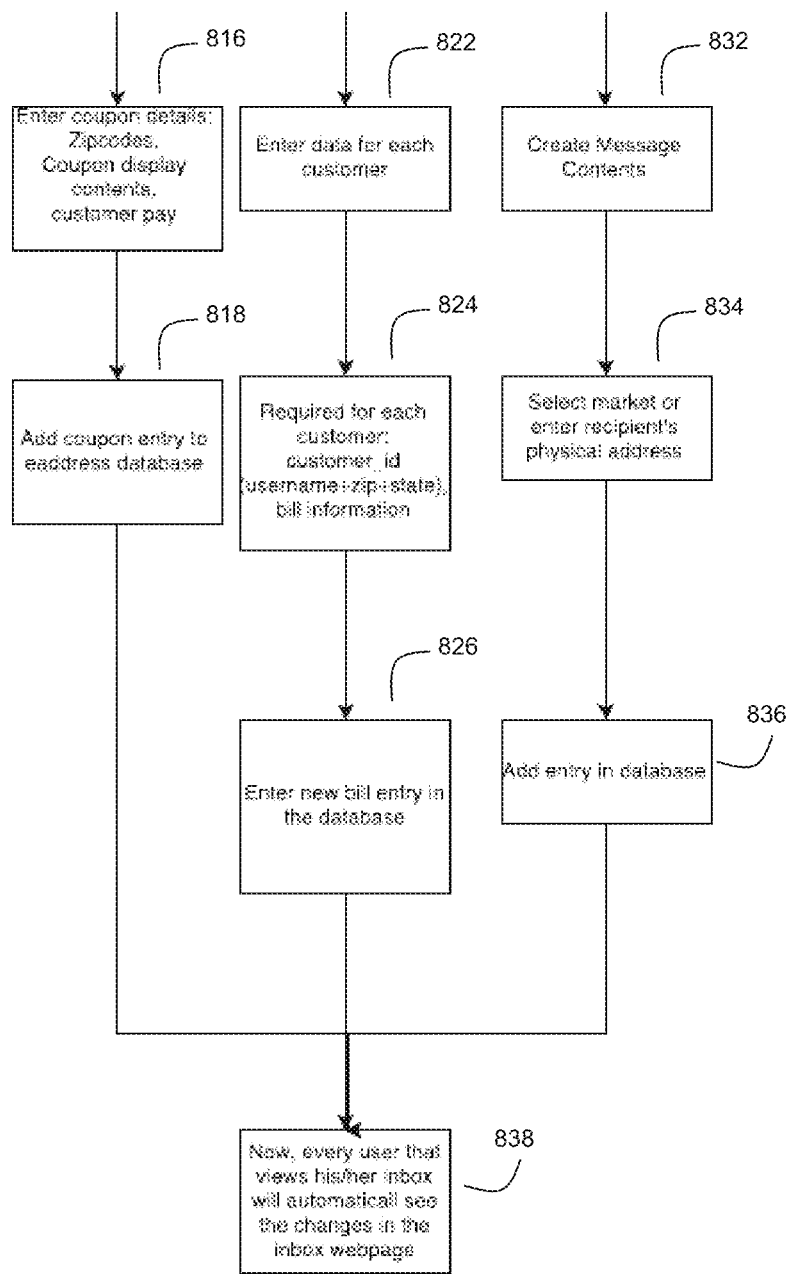

Looking at FIGS. 8A and 8B, a flow chart of a user accessing a company account of the electronic content delivery system is viewed. Like the previous figures, the user first accesses the electronic content delivery system's homepage 502 with the world wide web address bar on any type of internet browsing software. After entering this information the user is brought to the login page 506 where the user's account credentials may be entered for verification purposes. Once the correct credentials are entered, the company user is transferred to the company user's homepage 800. The company user's homepage 800 provides a snapshot of the services and options available to the company user accessing the electronic content delivery system 100. From the company user's homepage 800 a plurality of company account options are present. The user may access at 802 an account setting webpage to make changes to the existing company account, or the user may access at 808 the outbox homepage to track electronic content items sent from the company account. In some alternate embodiments, an inbox homepage for the company may also be present to see any electronic content items addressed to and received by the company account.

On the account setting webpage, the company user can adjust information related to the company account. The user may access a change settings feature 804 to change any of the identifiable information for the company account to be restored within the electronic content delivery system 100. This identifiable information may include but is not limited to the physical address of the company, the telephone number or contact number for the company, a first and last name of the user associated with managing the company account, the email address of the company or the user managing the company account, or the username and password for access to the company account. Once the updated settings are entered, the new information entered by the user of the company account is updated and stored at 806 within memory 104. By changing these identifiers, the company account can change the electronic address and physical address associated with that particular account. If the physical address is changed in this manner, the same verification process as discussed above can employed to both create a new electronic address for the account as well as confirming that the company is located at the new physical address. In this manner, the old physical address is released to be re-associated with a new account for any individual or company which may occupy the physical address at a later date. After the changes are updated and stored at 806, the user of the company account is returned to the company user's homepage 800 for additional actions available to the user of the company account.

From the company user's homepage 800, the user may select the outbox homepage option 808 bringing the user to the company outbox of sent electronic content items. On the outbox homepage 808, the user may view and select from a variety of sending options at 810 to send a new electronic content item to a customer known by the electronic content delivery system 100.

The following options 812 available to the user of the company account can be presented for illustrative purposes showing the functionality of the electronic content delivery system 100. While these options are available with these presently disclosed embodiments, others options and procedural steps may also be employed to the electronic content delivery system 100 to achieve the same end result.

One option available to the user of the company account is the ability to send a coupon 814 or advertisement as an electronic content item. Once the coupon option 814 is selected, the user of the company account may enter at 816 the details of the coupon from his/her computer utilizing a GUI. This may include attaching readable files or other file extensions to the created coupon 814. Additionally, text and graphics may be entered by the user to develop the coupon 814. Once the coupon 814 is completed by the user, the user can then add additional details regarding who to send the coupon to, or how payment from the customer will be received or applied. In determining which customers will receive the coupon 814, the company account user may select a company-to-customer search table (see 624) that was created with the account. In this type of example, the company may select a specific zip code for customers to receive the coupon 814. The electronic content delivery system 100 will create a company-to-customer table for that specific zip code if one does not exist which allows the coupon 814 to be sent to all customers of that zip code when desired by the user of the company account. Also the user of the company account can also schedule when the coupon 814 is to be sent to the customers identified on the coupon 814.

Also, customer payment information can be included with the coupon 814. The envisioned electronic content delivery system 100 is viewed to help reduce the overall cost of paper mailers and the associated postage with these type of mailers and messages. Because of this, the company can pass the additional savings on to the customer account in the form of these types of coupons 814. In some embodiments, the user of the company account can identify a savings value for the coupon 814 to be sent out. Once the coupon 814 is sent, the electronic content delivery system 100 can track whether or not the customer opens the coupon 814 and if so the saving value may be subtracted from any purchases made by the customer at the company's store locations. Additionally, the electronic content delivery system 100 can also report back to the user of the company account how many sent coupons 814 were opened by customers to help track and target certain customer classes which often redeem the company's coupon or shop at the company's store locations.

Once all the coupon information is entered by the user of the company account, a coupon entry is stored and saved within the memory 104 at 818. When an affirmative action is executed by the user of the company account, the coupon 814 is then sent to all users identified to receive the coupon. Now, when the customer account user enters his/her inbox the coupon will be viewable by the customer (see 838).

Another option available to the user of the company account is the ability to send out a billing statement 820 as the electronic content item. The billing statement 820 may be any type of bill associated with the physical address of a specific customer including but not limited to utility bills or governmental bills such as property taxes. In this situation, the user of the company account will enter customer data at 822 for each billing statement 820 to be sent out. The electronic content delivery system 100 will require that the user of the company account enter the correct billing information at 824 for the billing statement 820 including the customer id (which may be a matching billing account number), a customer name and address, as well as the billing statement information. With the customer's name and address the electronic content delivery system can verify that that customer name and address is correct against the account data stored by memory 104 to make sure that the billing statement 820 is being sent to the correct customer. Having this verified information will allow the electronic content delivery system 100 to generate the correct customer electronic address from the stored database records.

Once all the billing statement information is entered by the user of the company account, the billing statement entry is stored and saved at 826 within the memory 104. When an affirmative action is executed by the user of the company account the billing statement 820 is then sent to the identified customer to receive the bill. Now, when the customer account user enters his/her inbox the billing statement will be viewable by the customer (see 838).

A third option available to the user of the company account is the ability to send out a general message 830 as the electronic content item. The general message 830 may be any type of correspondence that does not fit as a billing statement 820 or an advertisement or coupon 814. In this situation, the user of the company account will enter at 832 the type of data (either text or file attachments) to be sent out as the general message 830. From there the user of the company account may select either a market 834, such as the company-to-customer tables created earlier by the company to send the bill, or the user of the company account can simply input a known physical address to send the message 830. For these types of general message correspondences 830, the user of the company account does not need to know the exact customer information to send the message 830. After a physical address for the customer is inputted, the electronic content delivery system 100 will correlate and evaluate that address against the customer databases stored within memory 104. If a match is found, a correspondence entry will be added to the database at 836. If no match is found, an error message may be displayed to the user of the company account identifying that no known registered users are located at that address. Assuming a match is detected, an affirmative action is executed by the user of the company account to send the general message 830 or correspondence to the electronic address of the customer located at the entered physical address. Now, when the customer account user enters his/her inbox the general message 830 or correspondence will be viewable by the customer (see 838).

Figure 9A:
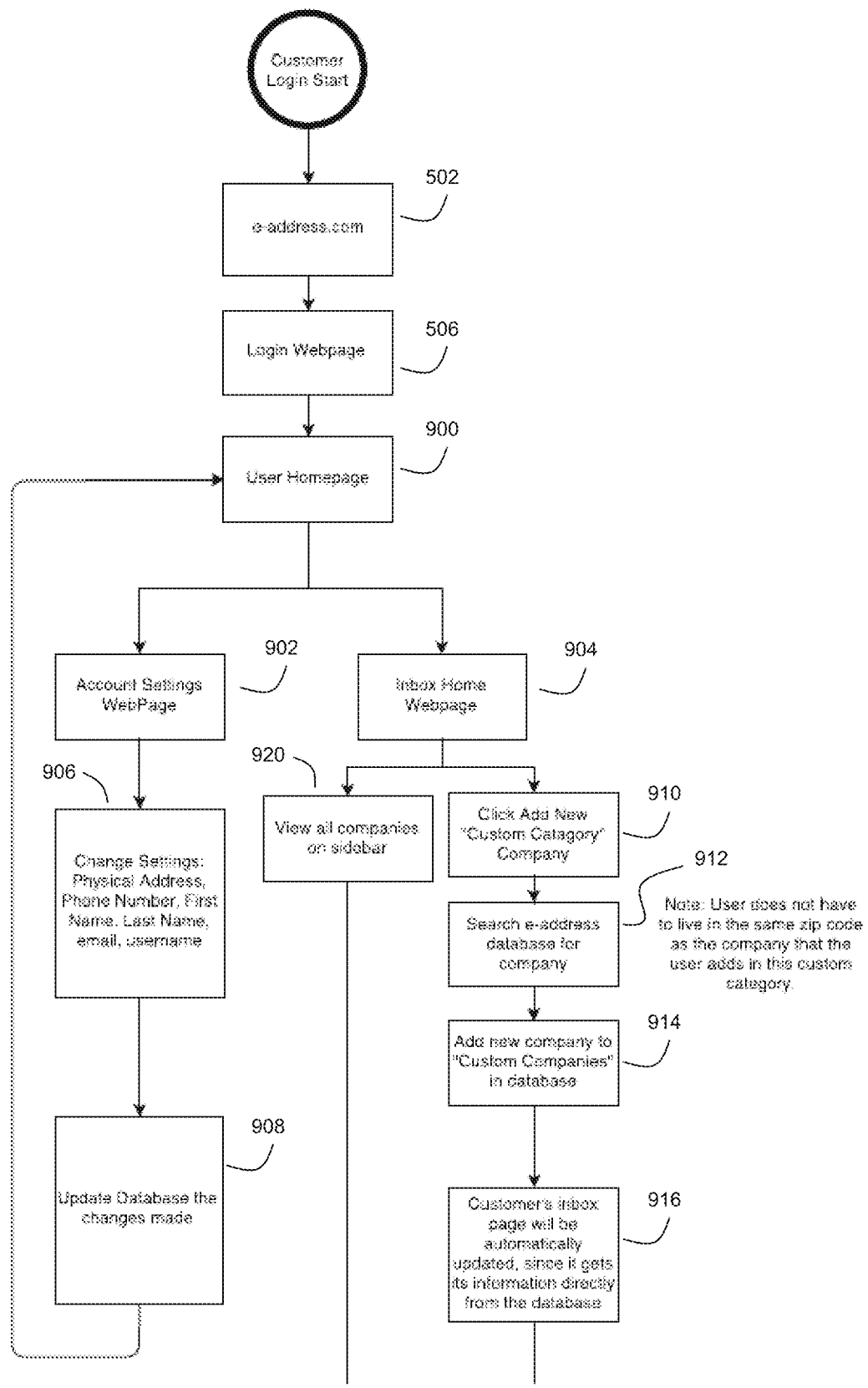
FIGS. 9A-C illustrate an example flow chart of a user accessing a customer account of the electronic content delivery system.
Figure 9B:
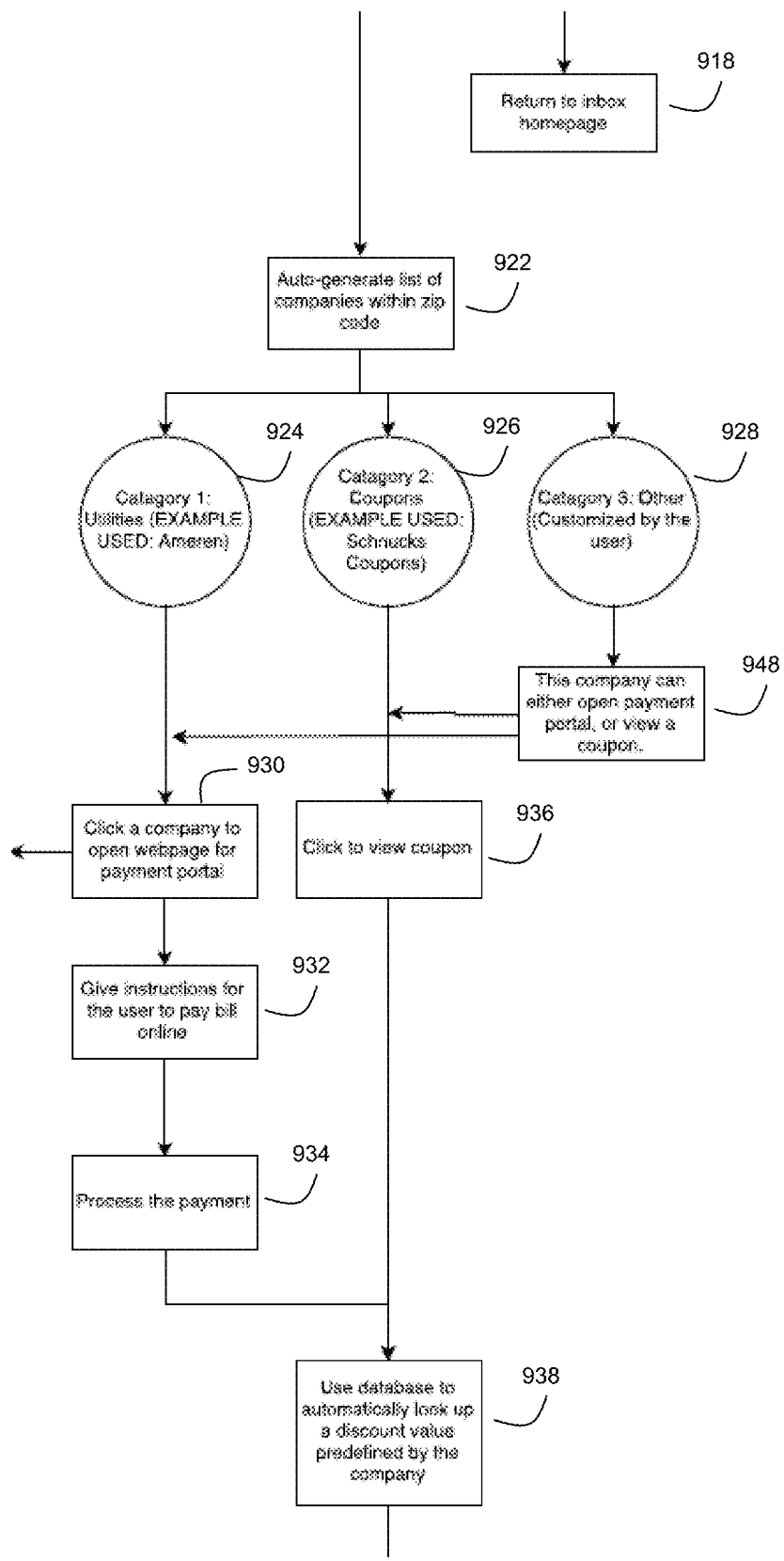
Figure 9C:
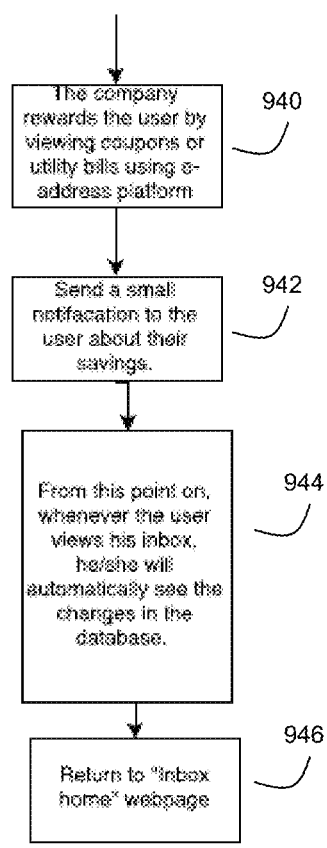

Turning now to FIGS. 9A-C, a flow chart of a user accessing a customer account of the electronic content delivery system is viewed. Like the previous figures, the user first accesses the electronic content delivery system's homepage 502 by inputting text into the world wide web address bar on any type of internet browsing software. After entering this information the user is brought to the login page 506 where the user's account credentials may be entered for verification purposes. Once the correct credentials are entered, the user is transferred to the customer user's homepage 900. The customer user's homepage 900 provides a snapshot of the services and options available to the user accessing the electronic content delivery system 100. From the customer user's homepage 900 a plurality of customer account options are presented. The user may access an account setting webpage 902 to make changes to the existing customer account, or the user may access the inbox homepage 904 to track electronic content items received from different company accounts. In some alternate embodiments, an outbox homepage for the customer may also be present to see any electronic content items sent to different customer or company accounts.

On the account setting webpage 902, the user can adjust information related to the customer account. The user may access a change settings feature 906 to change any of the identifiable information for the customer account to be restored within the electronic content delivery system 100. This identifiable information may include but is not limited to the physical address of the customer, the telephone number or contact number for the customer, a first and last name of the customer, the email address of the customer, or the username and password for access to the customer account. Once the updated settings are entered, the new information is updated and stored at 908 within memory 104. By changing these identifiers, the customer account can change the electronic address and physical address associated with that particular account. If the physical address is changed in the manner, the same verification process is employed to both create a new electronic address for the account as well as confirming that the customer is located at the new physical address. In this manner, the old physical address is released to be re-associated with a new account for any individual or company which might occupy the physical address at a later date. After the changes are updated and stored at 908, the user is returned to the customer user's homepage 900 for additional action items available to the user.

The following options available to the user of the customer account are presented for illustrative purposes showing the functionality of the electronic content delivery system 100. While these options are available with these presently disclosed embodiments, others options and procedural steps may also be employed by the electronic content delivery system 100 to achieve the same end result.

From the customer user's homepage 900, the user may select the inbox homepage option 904 bringing the user to the customer's inbox of received electronic content items. Here the user may select the custom category tab 910 to add a new company to the received electronic content items sent to the user and available within the user's inbox. After selecting the custom category tab 910, the user may search the database of the electronic content delivery system 100 at 912 for all companies registered within the system 100. When the appropriate company is selected, that company will be added at 914 to the customer's inbox homepage 904 to receive electronic content items from that company. If the company is not returned from a search of the memory 104, the user may elect to add a new company by selecting the custom companies tab 914 and entering the identifiable information for the new company. This information is then stored within the memory 104 for identification purposes so that if the company is later found, or later registers, the customer will receive electronic content items from the identified company. Once a company has been added by the user in either circumstance, the customer's inbox homepage 904 will be automatically updated for information related to and electronic content items sent from the company. This occurs since the customer's inbox homepage 904 gets its information directly from the stored information within the memory 104. The user is then returned at 918 to the inbox homepage 904 of the customer account.

Also from the inbox home webpage 904 of the customer account 508, the user can view all companies which have been added to the customer account on a sidebar 920 of the inbox home webpage 904. This sidebar 920 of companies may be auto generated at 922 on the inbox home webpage 904 of the customer account to include all registered companies for a particular identifier. Commonly, the list auto generated at 922 will include all registered companies within the same zip code as the registered customer. Further, the sidebar 920 of the inbox home webpage 904 of the customer account can separate the electronic content items received by each of the companies to the three distinct options of sendable electronic content items available to be sent by the companies. This subdivision includes billings statements 924, coupons 926 or advertisements, and general messages 928 or correspondences.

Thus, it should be understood that when users register with the system via a customer account, the software can provide suggested companies providing services at that user's physical address. For example, by knowing the user's zip code, the software can provide the user with a list of the known companies providing services within a geographic area that encompasses the user's physical address. The system can know which electric company, gas company, water company, etc. is providing services to a specific address, and during the user's registration, the user can be provided with an opportunities to see these potential service providers. Additionally, if a merchant (e.g., a pharmacy) has registered itself as serving the same zip code as the zip code for the user's physical address, the system can identify such a merchant on the user's in-box page as an available merchant for the user. If the user prefers to shop there, the user can choose to keep that merchant in his or her in-box. Users can also select custom companies. Thus, through the system, the user is provided with a capability for replacing many "apps" (or other electronic connections) with numerous merchants and service providers with a single consolidated platform, which has numerous technical benefits for users (e.g., for scenarios where a user has been maintaining separate "apps" on his or her mobile device for each merchant and service providers, the system will allow the user to free up memory space on the mobile device by deleting multiple apps and replacing the multiple apps with a consolidated app for the subject system). Such a design can also benefit small companies which may not be able to afford apps but still want to electronically connect with a wide array of users.

If a billing statement 924 is selected from the list of electronic content items, the user may click the billing statement 924 to open the message. Embedded within the billing statement 924 and the corresponding message may be a link to the company webpage or payment portal (see 930) for the customer to click. Clicking this link or payment portal option at 930 can send the customer to an outside webpage of the company for payment options for satisfying the billing statement 924. The billing statement 924 or corresponding message will also include at 932 a list of instructions to the customer as to how the payment of the bill may be satisfied. The electronic content delivery system 100 will then aid the customer in the payment process 934 and confirm with the customer that the payment has been received or processed with the company. Next, the electronic content delivery system 100 will access the memory 104 at 938 to determine if any discounts, rebates, or coupons may be predefined by the company for use by the user in paying the billing statement 924 through the electronic content delivery system 100. If so, these discounts, rebates, or coupons will be applied at 940 to the processed payment 934 and deducted from the overall total thereby rewarding the customer for using the electronic content delivery system 100 as the preferred payment method. The electronic content delivery system 100 may then generate a savings message at 942 to be sent to the customer notifying the customer of any savings that were redeemed or applied to the billing statement payment 934. Once the payment is made and received, the customer with automatically see the changes in the database within the customer's inbox to show that the electronic content item was opened, viewed, and in the case of the billing statement, paid (see 944). Afterwards, the customer is returned at 946 to the inbox home webpage 904 of the customer account to take any additional actions the user may desire.

The customer may also select a coupon 926 or advertisement from the list of electronic content items. The user may click the coupon 926 to open the message. The customer will then be able at 936 to view the coupon 926 and any other attachments sent with the coupon 926 which detail sales information, rebates, or discounts available to the customer. The electronic content delivery system 100 will access the memory 104 at 938 to determine if any discounts, rebates, or price reductions may be predefined by the company for use by the user accessing the coupon 926 through the electronic content delivery system 100. If so, these discounts, rebates, or coupons will be applied at 940 to the processed payment of items selected within an embedded link clickable by the customer on the coupon 926. The electronic content delivery system 100 may then generate a savings message at 942 to be sent to the customer notifying the customer of any savings that were redeemed or applied because of the coupon redemption. For in-store purchases, a printing option may be available to the customer to print the coupon 926 to physically be taken with the customer to the store location. During future access to the customer inbox, the customer will automatically see the changes in the database to show that the electronic content item 140 was opened, viewed, and in some cases that the coupon was redeemed, expired, or still available (see 944). Afterwards, the customer is returned at 946 to the inbox home webpage 904 of the customer account 508 to take any additional actions the user may desire.

Thus, it should be understood that the system can be designed to allow content senders to reward users who access content via the system. Each content sender can define a reward amount applicable to various actions by a user with the system (e.g., opening a content item from that sender), and the balance of the reward account can be increased in response to the user performing the defined action. These rewards can take the form of monetary rewards, discounts from service providers, or other incentives to use the system as the mechanism for accessing content.

Additionally, the customer may select the general message 928 or correspondence category from the list of electronic content items. The user may click the general message or correspondence to open the message. The customer will then be able to view the general message 928 or correspondence and any other attachments sent with the general message or correspondence. In some instances the general message 928 or correspondence will open up a payment portal option 948 or a coupon option which can then be processed in the same manner as described above. The general message 928 or correspondence tab is utilized by electronic content items which may not fit exactly within the other two categories. Also, the general message 928 or correspondence may be used for messages from companies unfamiliar to the customer as a safe guard of the customer's personal identification to determine if messages for these companies should be continually received in the future or be removed from the company list. The customer can then be picky and choose which of these general message 928 or correspondence to open and what companies he/she wishes to received electronic content items from in the future.

Figure 10:
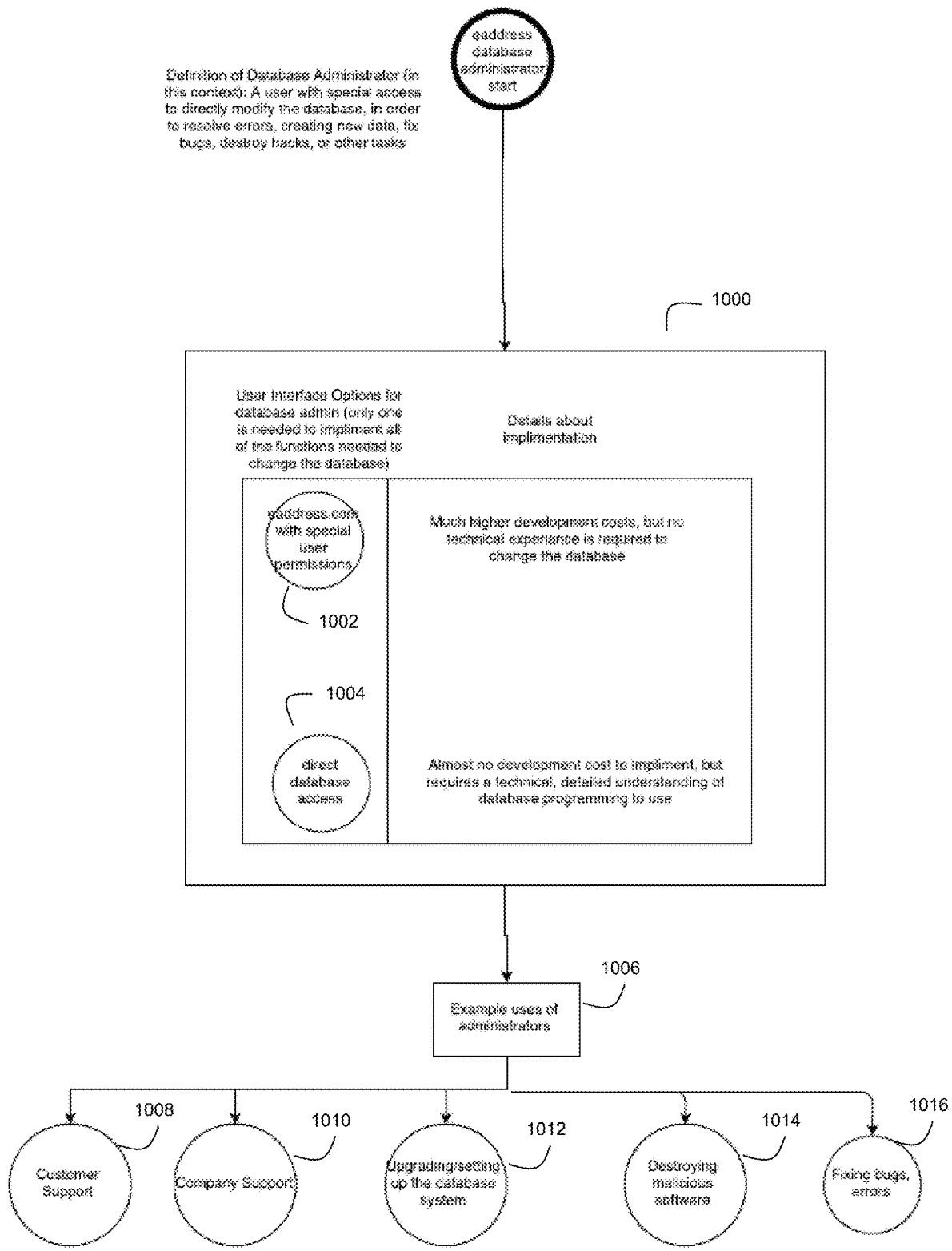
FIG. 10 illustrates an example flow chart of a database or system administrator's access to the electronic content delivery system.

Looking now to FIG. 10, a flow chart of a database or system administrator's access 516 to the electronic content delivery system 100 is viewed. Like the previous figures, the database or system administrator 516 first accesses the electronic content delivery system's homepage 502 by inputting text into the world wide web address bar on any type of internet browsing software. After entering this information the database or system administrator is brought to a login page 506 where the database or system administrator account credentials may be entered for verification purposes. Once the correct credentials are entered and verified, the database or system administrator 516 is transferred to the administrator homepage 1000. As stated earlier, the database or system administrator 516 is a user with special access to directly modify the memory 104 of the electronic content delivery system 100. The database or system administrator 516 may do this in order to resolve errors, create new data, fix bugs, destroy hack, or various other administrative tasks requiring special attention. The database or system administrator 516 can be provided with special user permissions (see 1002) to enter the core software code of the electronic content delivery system 100. In some levels of development certain database or system administrator privileges may be tiered so that certain database or system administrators 516 can access the electronic content delivery system 100 to address some issues or errors but may not be able to access or correct more substantial issues or errors. In other instances, all database or system administrators 516 will have direct access at 1004 to the data storage 120 to correct all issues and errors within the electronic content delivery system 100. The database or system administrators 516 may provide a variety of resources functions 1006 to each the electronic content delivery system 100 as well as companies and customers. The database or system administrators 516 may act as customer and company support (see 1008 and 1010) for select customer or company accounts having issues accessing and/or sending electronic content items through the electronic content delivery system 100. The database or system administrators 516 can also upgrade and set up the data storage and partitions therein for improvements in the quality and execution of the electronic content delivery system 100 (see 1012). Finally, the database or system administrators 516 can destroy malicious software (see 1014) which may enter the electronic content delivery system 100 through attachments or unscrupulous messages in the electronic content items as well as fix bugs and errors in the underlying software code (see 1016).

Figure 11:
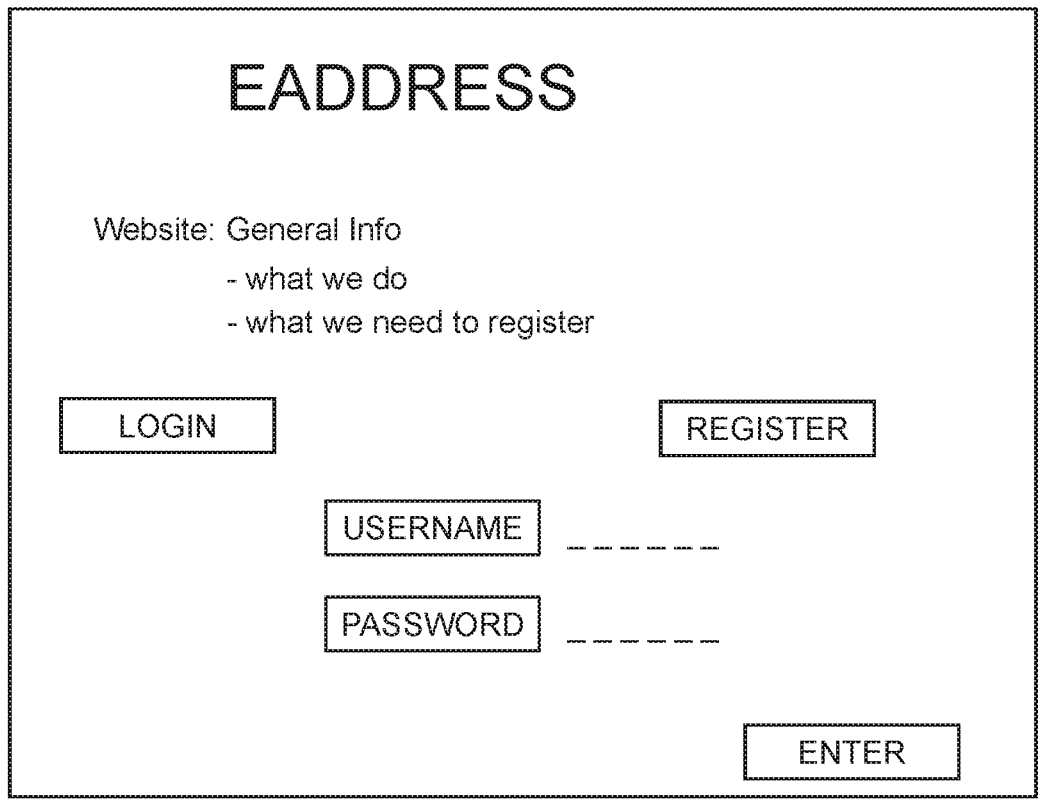
FIG. 11 illustrates a homepage GUI of the electronic content delivery system according to an example embodiment.

FIG. 11-14 show various screenshots of example GUIs that can be presented to users of the electronic content delivery system 100. FIG. 11 shows an example homepage 502 screenshot of the electronic content delivery system 100. On the homepage 502, clickable buttons can be present which may direct a user to either login in or register onto the electronic content delivery system 100. Input text boxes for both the username and password for access into the electronic content delivery system 100 are also provided so that registered user accounts can enter.

FIG. 12 shows an example screenshot of the registration page for users wishing to set up and account with the electronic content delivery system. Here users may select between an individual (or customer) account or a company account. Input text boxes are present so that a user can enter information related to his/her or the company's name, address, city of residence, state, zip code, telephone number, and email address. The user may also select whether the physical address provided is a residential address or a business address. Another check box is present at the bottom of the GUI where the user may click to have the electronic content delivery system software validate the provided address against the memory 104 of the electronic content delivery system 100 or through access to other outside databases by the software.

FIG. 13 shows an example screenshot of the inbox 904 of a user account for the electronic content delivery system 100. Within the inbox, the name of the individual/company and the address of the individual/company is viewed. It can also be seen the tabular sidebar 920 company headings which are selectable for received electronic content items. The subheading include utilities, coupons, and a custom tab all of which can be manipulated and customized by the user through the appropriate account settings feature.

Figure 14:
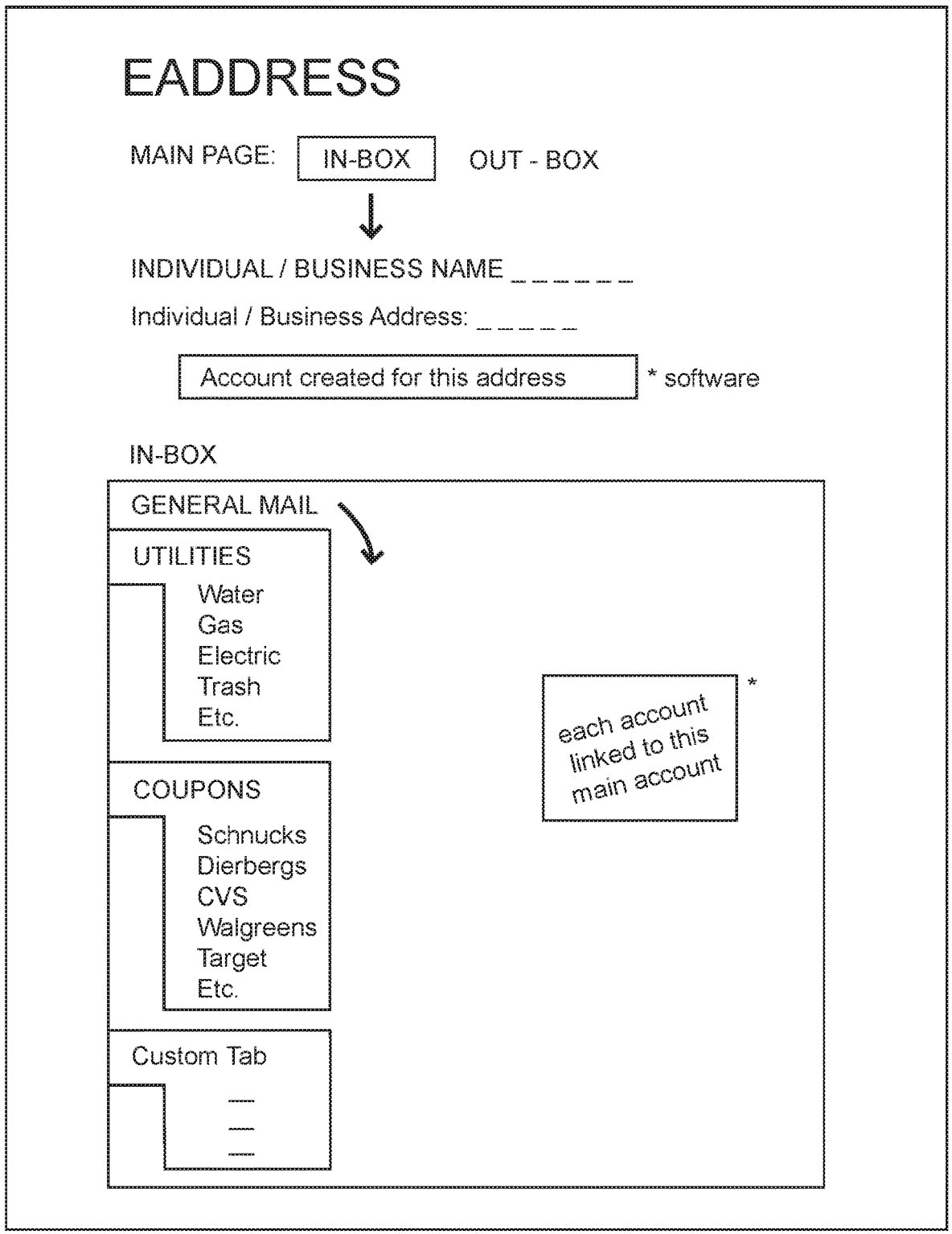
FIG. 14 illustrates a GUI of the outbox user account for the electronic content delivery system in an example embodiment.

FIG. 14 shows an example screenshot of the outbox 808 of a user account for the electronic content delivery system 100. Here input text boxes are present so that the electronic content item sender may input the individual/company name and individual/company address where the electronic content item 140 should be sent. As noted before, the addresses entered into these input text boxes represent the physical address of these individuals/companies and the electronic content delivery system software determines and matches this physical address with the electronic address created and stored within the electronic content delivery system 100. Once the electronic content item is created and any attachments are added, the user may validate that the information for the individual/business is correctly matched with a sendable account of the electronic content delivery system 100. If so, the user may then click the send button to send the message to the identified individual/company.

It should be understood that FIG. 14 depicts an account for a single electronic address, and all communications (such as utility bills, coupons CVS etc.) can be sub-accounts linked to the user's main account. It should also be understood that content senders can send content to users through techniques other than sending document attachments to a user's account (via the electronic address). For example, a content sender could send content to a user by directly generating content in the user's account if the system provides content senders with direct access to user accounts.

In view of the foregoing, it will be seen that the several advantages of the invention are achieved and attained. The disclosed electronic content delivery system 100 and method in which the electronic content delivery system 100 is operated provides many improvements over other existing physical and electronic mailing systems. The disclosed electronic content delivery system provides a system where physical documents and correspondences no longer needed to be sent to physical addresses. This may reduce the amount of lost mail through the physical mailing process as well as reduce costs associated with large quantity mailings of this type. In many cases large quantities of mailings to physical addresses are needed for utility companies since usages at a particular physical address is what concerns the payment of services rendered. The electronic content delivery system 100 solves the problem of sending the large amount of mailings, whether it be utility bills, coupons or advertisements through postal mail with the reduced cost of providing a reliable electronic mailing system, all while alleviated the company from knowing the personal email address or mobile number of the customers. Furthermore, the electronic content delivery system 100 provides a categorical improvement on these mass mailings so that the end user can easily identify the purpose of the correspondence (i.e. where a correspondence is a bill, coupon, or simply a product offering). The electronic content delivery system 100 eliminates the process of physically sending mail to associated physical mailing address and shares the cost companies and consumers must pay for sending such items. As such, these savings can be passed on to the customers who open and utilize bill payments and coupons received by the electronic content delivery system 100.

Additionally, the electronic content delivery system 100 provides an technically innovative way of sending electronic communications. A physical address for a correspondence is assigned an electronic address which corresponds to the user occupying or owning the physical address. To send communications electronically, a user of the electronic content delivery system needs to only know the physical address of the individual/company for the correspondence (or the corresponding electronic address) and the electronic content delivery system 100 will be able to deliver the content to the appropriate recipient. The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. For example, the options descripted and available for electronic content items to be sent or received in a user's inbox or outbox may be adjusted and customized to include more options not expressly discussed within the present application. Thus, the breadth and scope of the present invention should not be limited by any of the above-described example embodiments, but should be defined only in accordance with the following claims appended hereto and their equivalents.

What is claimed is:

1. An electronic content delivery system comprising:
   a network interface through which electronic content is received, the electronic content comprising a plurality of electronic content items for receipt by a plurality of users associated with a plurality of physical addresses;
   a memory that comprises (1) a first plurality of memory addresses that are arranged as a plurality of accounts, wherein each account is associated with a user and serves as a destination for received electronic content items, and (2) a second plurality of memory addresses that are arranged as a data structure that associates (i) users with the destination accounts, (ii) electronic addresses with physical addresses, and (iii) physical addresses with users, wherein at least one of the physical addresses is associated with a plurality of the users such that a plurality of the destination accounts are tied to the same at least one physical address; and
   a processor for cooperation with the memory and the network interface, the processor configured to:
      receive a plurality of electronic content items via the network interface, each of a plurality of the received electronic content items having at least one of a destination physical address and a destination electronic address associated therewith;
      for each of a plurality of the received electronic content items, (1) access the data structure in the memory to determine the destination account for that electronic content item based on (i) at least one of (a) the destination physical address and/or (b) the destination electronic address for that electronic content item and (ii) the associations in the data structure corresponding to at least one of the destination physical address and/or the destination electronic address for that electronic content item, and (2) store that electronic content item in the memory in association with the determined destination account;
      receive a plurality of account access requests from a plurality of users;
      for each received account access request from a user, (1) determine the destination account corresponding to that received account access request based on the associations in the data structure, (2) verify whether that user is authorized to access the determined destination account, and (3) in response to a verification that the user is authorized to access the determined destination account, provide the user with access to an electronic content item that is stored by the memory in association with the determined destination account; and
      in response to a notification that a user has a changed physical address, update the data structure such that that user becomes associated with the changed physical address, wherein the updated data structure causes the destination account associated with that user to become associated with a different electronic address, wherein the different electronic address is associated by the data structure with the changed physical address.

2. The system of claim 1 wherein each of a plurality of the received electronic content items has a destination electronic address associated therewith, and wherein the processor is further configured to:
   for each of a plurality of the received electronic content items, (1) determine the electronic address associated therewith, (2) access the data structure, (3) determine the destination account associated with the determined electronic address based on the accessed data structure, and (4) store that electronic content item in the memory in association with the determined destination account.

3. The system of claim 1 wherein each of a plurality of the received electronic content items has a destination physical address associated therewith, and wherein the processor is further configured to:
   for each of a plurality of the received electronic content items, (1) determine the destination physical address associated therewith, (2) access the data structure, (3) determine the electronic address associated with the determined destination physical address based on the accessed data structure, (4) determine the destination account associated with the determined electronic address based on the accessed data structure, and (5) store that electronic content item in the memory in association with the determined destination account.

4. The system of claim 1 wherein the data structure also associates the destination accounts with authorization credentials for their associated users; and
   wherein the processor is further configured to verify whether users are authorized to access destination accounts based on a comparison between the authorization credentials in the data structure and authorization credentials received from the users.

5. The system of claim 4 wherein the authorization credentials in the data structure comprise user identifiers and passwords.

6. The system of claim 1 wherein each of a plurality of the electronic addresses comprises a text string, wherein the text string includes a street address and postal code for the physical address associated with that electronic address.

7. The system of claim 1 wherein the processor is further configure to send a notification to a user in response to a new electronic content item being stored in the destination account associated by the data structure with that user.

8. The system of claim 7 wherein the data structure also associates a plurality of the users with mobile numbers for those users; and
   wherein the processor is further configured to send the notification to the user as a text message to the mobile number associated by the data structure with that user.

9. The system of claim 7 wherein the data structure also associates a plurality of the users with email addresses for those users; and
  wherein the processor is further configured to send the notification to the user as an email to the email address associated by the data structure with that user.

10. The system of claim 7 further comprising:
  a mobile application configured for execution by a mobile device, wherein the mobile application is configured to provide a user with GUI access to that user's associated destination account.

11. The system of claim 10 wherein the data structure also associates a plurality of the users with mobile numbers for those users; and
  wherein the processor is further configured to send the notification to the user as a push notification to the mobile device for the mobile number associated by the data structure with that user.

12. The system of claim 1 further comprising:
  a web application configured for access by a user computer via a browser, wherein the web application is configured to provide a user with GUI access to that user's associated destination account.

13. The system of claim 1 wherein the processor is further configured to:
  categorize each of a plurality of the received electronic content items according to a plurality of categories;
  provide authorized users with access to their destination accounts via a graphical user interface (GUI) display that includes a plurality of category-specific sections that are labeled to indicate their specific categories, wherein each category-specific section is configured to provide the authorized user with access to any stored electronic content items for that destination account that share the same categorization as that category-specific section.

14. The system of claim 13 wherein the categories include at least one bill category.

15. The system of claim 14 wherein the at least one bill category includes at least one of an electric bill category, a gas bill category, a subscription media bill category, a mobile telephone bill category, a data service bill category, a credit card statement bill category, a mortgage bill category, and a tax bill category.

16. The system of claim 13 wherein the categories include at least one marketing category.

17. The system of claim 13 wherein the categories include at least one user-defined category.

18. The system of claim 1 wherein the processor is further configured to (1) detect when a user opens electronic content items stored by the memory in association with that user's destination account, and (2) send a notification about the detected opening to a sender of the opened electronic content item.

19. The system of claim 18 wherein the notification includes a date and time that the opened electronic content item was opened.

20. The system of claim 18 wherein the electronic content includes a plurality of coupons.

21. The system of claim 18 wherein the electronic content includes marketing material.

22. The system of claim 1 wherein the processor is further configured to (1) monitor a database that maintains records that associate people with physical addresses, (2) determine from the monitored database when a user has a changed physical address, and (3) generate the notification about the changed physical address for a user in response to the determination.

23. The system of claim 1 wherein the processor is further configured to (1) monitor a database that maintains records that associate people with physical addresses, (2) determine from the monitored database when a physical address becomes associated with a different user, and (3) generate the notification about the changed physical address for a user in response to the determination.

24. The system of claim 1 wherein the memory comprises a plurality of physical memory devices.

25. The system of claim 24 wherein the physical memory devices include:
  a first physical memory device configured to store the destination accounts and the electronic content items; and
  a second physical memory device configured to store the data structure.

26. The system of claim 1 wherein the data structure comprises a plurality of data structures, the plurality of data structures including:
  a first data structure that associates users with the destination accounts;
  a second data structure that associates electronic addresses with physical addresses; and
  a third data structure that associates physical mailing addresses with users.

27. The system of claim 26 wherein the data structures further include:
  a fourth data structure that associates the destination accounts with at least one of electronic addresses and physical addresses.

28. The system of claim 1 wherein the processor comprises a plurality of processors.

29. An electronic content delivery method:
  a computer system creating a plurality of electronic addresses that correspond to a plurality of physical addresses;
  the computer system receiving registration requests from a plurality of users, wherein the users include a plurality of company account users and a plurality of individual users;
  the computer system processing the received registration requests by:
    for each of a plurality of the users, the computer system (1) validating a physical address for the user, (2) associating the user with the electronic address corresponding to the validated physical address, and (3) creating an account for the user, wherein the account for the user (i) serves as a destination for electronic content items and (ii) has an association with the user's validated physical address and its corresponding electronic address, and wherein the associating step associates at least one validated physical address with a plurality of the users such that a plurality of the destination accounts are tied to the same at least one validated physical address;
  the computer system identifying an individual account user whose validated physical address is within a service area of a company account user;
  the computer system creating a line of communication between the identified individual account user and the company account user whose service area encompasses the validated physical address of the identified individual account user via the electronic address of the identified individual account user;

the computer system depositing electronic content items from the company account user whose service area encompasses the validated physical address of the identified individual account user into the destination account for the identified individual account user via the created line of communication;

repeating the identifying, creating, and depositing steps for a plurality of the individual users and a plurality of the company account users;

the computer system providing users with access to electronic content items deposited in their destination accounts via a GUI display; and the computer system changing which users are associated with which electronic addresses in response to users moving to new physical addresses such that a user who moves away from a previous physical address is no longer associated with the electronic address corresponding to the previous physical address; and wherein the destination accounts remain associated with their users as their users move to new physical addresses so that the destination accounts become associated with the new physical addresses for their associated users and continue to serve as destinations for electronic content items targeted to the users' new physical addresses.

30. A computer program product comprising:

a plurality of processor-executable instructions that are resident on a non-transitory computer-readable storage medium, wherein the instructions, upon execution by a processor, are configured to cause the processor to:

create a plurality of electronic addresses that correspond to a plurality of physical addresses;

receive registration requests from a plurality of users;

in response to the received registration requests, for each of a plurality of the users, (1) validate a physical address for the user, (2) associate the user with the electronic address corresponding to the validated physical address, and (3) create an account for the user, wherein the account for the user serves as a destination for electronic content items, and wherein at least one validated physical address is associated with a plurality of the users such that a plurality of the destination accounts are tied to the same at least one validated physical address;

notify a plurality of content senders about the electronic addresses for the users' validated physical addresses;

receive a plurality of electronic content items from the content senders, wherein the received electronic content items are addressed to a plurality of the electronic addresses;

store the received electronic content items in the destination accounts for the users who are associated with the electronic addresses addressed by the received electronic content items;

provide users with access to electronic content items stored in their destination accounts via a GUI display; and change which users are associated with which electronic addresses in response to users moving to new physical addresses such that a user who moves away from a previous physical address is no longer associated with the electronic address corresponding to the previous physical address;

wherein the correspondences between electronic addresses and physical addresses do not change as users move to new physical addresses; and wherein the destination accounts remain associated with their users as their users move to new physical addresses so that the destination accounts become associated with the new physical addresses for their associated users and continue to serve as destinations for electronic content items addressed to the electronic addresses corresponding to the users' new physical addresses.

31. The system of claim 1 wherein the plurality of users associated with the same at least one physical address comprise a first user and a second user; and wherein the same at least one physical address is associated with a first electronic address and a second electronic address, the first electronic address being associated with the first user and the second electronic address being associated with the second user.

32. The system of claim 31 wherein the first electronic address reflects an identifier for the first user and the second electronic address reflects an identifier for the second user.

33. The system of claim 31 wherein the plurality of electronic content items to be delivered to the same at least one physical address associated with the first and second users comprise a first electronic content item associated with the first electronic address and a second electronic content item associated with the second electronic address, and wherein the processor is further configured to (1) deliver the first electronic content item to the destination account associated with the first user based on the first electronic address and (2) deliver the second electronic content item to the destination account associated with the second user based on the second electronic address.

34. The method of claim 29 wherein the plurality of users associated with the same at least one physical address comprise a first user and a second user; and wherein the creating step includes, for the same at least one validated physical address, creating (1) a first electronic address corresponding to the same at least one validated physical address and (2) a second electronic address corresponding to the same at least one validated physical address, the first electronic address being associated with the first user and the second electronic address being associated with the second user.

35. The method of claim 34 wherein the first electronic address reflects an identifier for the first user and the second electronic address reflects an identifier for the second user.

36. The method of claim 34 wherein the electronic content items comprise a plurality of electronic content items targeted to the same at least one validated physical address, the electronic content items including a first electronic content item associated with the first electronic address and a second electronic content item associated with the second electronic address, the method further comprising the computer system (1) delivering the first electronic content item to the destination account associated with the first user based on the first electronic address and (2) delivering the second electronic content item to the destination account associated with the second user based on the second electronic address.

37. The computer program product of claim 30 wherein the plurality of users associated with the same at least one physical address comprise a first user and a second user; and wherein the instructions, upon execution by the processor, are further configured to cause the processor to, for the same at least one validated physical address, create (1) a first electronic address corresponding to the same at least one validated physical address and (2) a second electronic address corresponding to the same at least one validated physical address, the first electronic address being associated with the first user and the second electronic address being associated with the second user.

38. The computer program product of claim 37 wherein the first electronic address reflects an identifier for the first user and the second electronic address reflects an identifier for the second user.

39. The computer program product of claim 37 wherein the plurality of electronic content items to be delivered to the same at least one physical address associated with the first and second users comprise a first electronic content item associated with the first electronic address and a second electronic content item associated with the second electronic address, and wherein the instructions, upon execution by the processor, are further configured to cause the processor to (1) deliver the first electronic content item to the destination account associated with the first user based on the first electronic address and (2) deliver the second electronic content item to the destination account associated with the second user based on the second electronic address.

40. The system of claim 1 wherein each of a plurality of the electronic addresses (1) corresponds to a single physical address and a single destination account at a given time and (2) is represented by a text string that conceals the physical address associated with that electronic address, and wherein the text string does not include a user name for the user associated with the physical address associated with that electronic address.

41. The system of claim 40 wherein a plurality of the users comprise company account users;
wherein another plurality of the users comprise individual account users; and
wherein the processor, for each of a plurality of the individual account users, is further configured to (1) notify an individual account user of a company account user that provides service to the physical address for that individual account user, (2) receive a selection corresponding to the company account user from the individual account user in response to the notification, and (3) in response to the selection, permit the corresponding company account user to send electronic content to the destination account of the notified individual account user.

42. The system of claim 41 wherein the processor is further configured to (1) search the memory based on a geographic search parameter to permit a company account user to identify potential customers among the individual account users, (2) create a list of the identified potential customers, wherein the list comprises individual account users whose associated physical addresses correspond to the geographic search parameter, and (3) create electronic content for delivery from that company account user to individual account users on the created list subject to the selections from the individual account users.

43. The system of claim 1 wherein the destination accounts are not email address accounts.

44. The system of claim 1 wherein the data structure directly associates the destination accounts with the users and indirectly associates the destination accounts with the physical addresses and the electronic addresses so that the destination accounts remain with their associated users when their associated users change their physical addresses.

45. The method of claim 29 wherein each of a plurality of the electronic addresses (1) corresponds to a single physical address and a single destination account at a given time and (2) is represented by a text string that conceals the physical address associated with that electronic address, and wherein the text string does not include a user name for the user associated with the physical address associated with that electronic address.

46. The method of claim 45 further comprising:
the computer system notifying an individual account user of a company account user that provides service to the physical address for that individual account user;
the computer system receiving a selection corresponding to the company account user from the individual account user in response to the notification; and
in response to the selection, the computer system permitting the corresponding company account user to send electronic content to the destination account of the notified individual account user; and
wherein the computer system repeats the notifying, selection receiving, and permitting steps for a plurality of the individual account users.

47. The method of claim 46 further comprising:
the computer system searching the memory based on a geographic search parameter to permit a company account user to identify potential customers among the individual account users;
the computer system creating a list of the identified potential customers, wherein the list comprises individual account users whose associated physical addresses correspond to the geographic search parameter; and
the computer system creating electronic content for delivery from that company account user to individual account users on the created list subject to the selections from the individual account users.

48. The method of claim 29 wherein the destination accounts are not email address accounts.

49. The method of claim 29 further comprising:
the computer system directly associating the destination accounts with the users and indirectly associating the destination accounts with the physical addresses and the electronic addresses so that the destination accounts remain with their associated users when their associated users change their physical addresses.

50. The method of claim 29 wherein the correspondences between electronic addresses and physical addresses do not change as users move to new physical addresses.

51. The computer program product of claim 30 wherein each of a plurality of the electronic addresses (1) corresponds to a single physical address and a single destination account at a given time and (2) is represented by a text string that conceals the physical address associated with that electronic address, and wherein the text string does not include a user name for the user associated with the physical address associated with that electronic address.

52. The computer program product of claim 51 wherein a plurality of the users comprise company account users;
wherein another plurality of the users comprise individual account users; and
wherein the instructions, upon execution by the processor, are further configured to cause the processor, for each of a plurality of the individual account users, to (1) notify an individual account user of a company account user that provides service to the physical address for that individual account user, (2) receive a selection corresponding to the company account user from the individual account user in response to the notification, and (3) in response to the selection, permit the corresponding company account user to send electronic content to the destination account of the notified individual account user.

53. The computer program product of claim 52 wherein the instructions, upon execution by the processor, are further configured to cause the processor to (1) search the memory based on a geographic search parameter to permit a company account user to identify potential customers among the individual account users, (2) create a list of the identified potential customers, wherein the list comprises individual account users whose associated physical addresses correspond to the geographic search parameter, and (3) create electronic content for delivery from that company account user to individual account users on the created list subject to the selections from the individual account users.

54. The computer program product of claim 30 wherein the destination accounts are not email address accounts.

55. The computer program product of claim 30 wherein the instructions, upon execution by the processor, are further configured to cause the processor to directly associate the destination accounts with the users and indirectly associate the destination accounts with the physical addresses and the electronic addresses so that the destination accounts remain with their associated users when their associated users change their physical addresses.

* * * * *